(12) United States Patent
Kondo et al.

(10) Patent No.: US 11,080,119 B2
(45) Date of Patent: Aug. 3, 2021

(54) INFORMATION PROCESSING WITH FAILURE DETECTION, APPARATUS AND METHOD

(71) Applicants: PIONEER CORPORATION, Tokyo (JP); NIKKISO COMPANY LIMITED, Tokyo (JP)

(72) Inventors: Tadashi Kondo, Kawagoe (JP); Wataru Onodera, Kawagoe (JP); Tomoya Murakami, Makinohara (JP); Akari Agata, Makinohara (JP); Genki Adachi, Makinohara (JP)

(73) Assignees: PIONEER CORPORATION, Tokyo (JP); NIKKISO COMPANY LIMITED, Tokyo (JP)

( * ) Notice: Subject to any disclaimer, the term of this patent is extended or adjusted under 35 U.S.C. 154(b) by 86 days.

(21) Appl. No.: 16/492,339

(22) PCT Filed: Mar. 9, 2017

(86) PCT No.: PCT/JP2017/009558
§ 371 (c)(1),
(2) Date: Sep. 9, 2019

(87) PCT Pub. No.: WO2018/163371
PCT Pub. Date: Sep. 13, 2018

(65) Prior Publication Data
US 2021/0133016 A1    May 6, 2021

(51) Int. Cl.
*G06F 11/07* (2006.01)
*G06F 11/22* (2006.01)
*G06F 11/16* (2006.01)

(52) U.S. Cl.
CPC ...... *G06F 11/0724* (2013.01); *G06F 11/1641* (2013.01); *G06F 11/2289* (2013.01)

(58) Field of Classification Search
CPC ............ G06F 11/0724; G06F 11/1641; G06F 11/2289
See application file for complete search history.

(56) References Cited

U.S. PATENT DOCUMENTS

| | | | |
|---|---|---|---|
| 5,043,990 A | 8/1991 | Doi et al. | |
| 5,890,003 A * | 3/1999 | Cutts, Jr. | G06F 11/2017 710/263 |

(Continued)

FOREIGN PATENT DOCUMENTS

| | | | | |
|---|---|---|---|---|
| CA | 2059143 C * | 5/2000 | | G06F 12/0833 |
| CN | 102103531 A | 6/2011 | | |

(Continued)

OTHER PUBLICATIONS

Romuald Girardey et al., "Dynamic Reconfigurable Mixed-Signal Architecture For Safety Critical Applications", 2009, International Conference on Field Programmable Logic and Applications, FPL 2009, Piscataway, NJ, USA, pp. 503-506 (Year: 2009).*

(Continued)

*Primary Examiner* — Matthew M Kim
*Assistant Examiner* — Indranil Chowdhury
(74) *Attorney, Agent, or Firm* — Nixon & Vanderhye

(57) ABSTRACT

An information processing device is provided with: a first processing unit that generates first information by performing first processing with respect to sensor information acquired from a sensor; a second processing unit that generates second information by performing, with respect to the first information, second processing that is different from the first processing; and a third processing unit, which generates third information by performing, with respect to the first information, third processing, i.e., processing that corresponds to at least a part of the second processing, and (Continued)

which acquires the second information, and outputs the second information and the third information.

12 Claims, 27 Drawing Sheets

(56) References Cited

U.S. PATENT DOCUMENTS

| | | | |
|---|---|---|---|
| 7,420,658 B2 | 9/2008 | Pettersson et al. | |
| 9,491,228 B2 | 11/2016 | Sasaki | |
| 2005/0243303 A1 | 11/2005 | Pettersson et al. | |
| 2007/0273508 A1* | 11/2007 | Lalla | G05B 19/0428 340/540 |
| 2008/0275320 A1 | 11/2008 | Pettersson et al. | |
| 2008/0303920 A1* | 12/2008 | Kinoshita | H04N 5/2357 348/226.1 |
| 2009/0112111 A1* | 4/2009 | Shimizu | A61B 5/02405 600/520 |
| 2011/0153883 A1 | 6/2011 | Kato | |
| 2013/0304793 A1 | 11/2013 | Sasaki | |
| 2018/0129573 A1* | 5/2018 | Iturbe | G06F 11/184 |
| 2020/0228305 A1* | 7/2020 | Shimizu | H04J 3/0664 |

FOREIGN PATENT DOCUMENTS

| | | | | |
|---|---|---|---|---|
| CN | 103392173 A | 11/2013 | | |
| DE | 3840969 A1 | 6/1989 | | |
| EP | 2837327 A1 | 2/2015 | | |
| JP | H01-280839 A | 11/1989 | | |
| JP | 2002-247012 A | 8/2002 | | |
| JP | 2006-228002 A | 8/2006 | | |
| JP | 2011-128821 A | 6/2011 | | |
| JP | 2016-085162 A | 5/2016 | | |
| WO | 2004/057313 A1 | 7/2004 | | |
| WO | 2012/120578 A1 | 9/2012 | | |
| WO | 2013/153664 A1 | 10/2013 | | |
| WO | WO-2018138467 A1 * | 8/2018 | | G06F 11/0721 |

OTHER PUBLICATIONS

Japanese Patent Office Written Opinion dated Dec. 21, 2020, from corresponding Japanese Patent Application JP2019504239 (Year: 2020).*
Japanese Patent Office Reasons for Refusal dated Nov. 4, 2020, from corresponding Japanese Patent Application JP2019504239 (Year: 2020).*
European Patent Office Search Report dated Feb. 22, 2021, from corresponding European Patent Application EP17900036 (Year: 2021).*
European Patent Office Written Opinion dated Feb. 22, 2021, from corresponding European Patent Application EP17900036 (Year: 2021).*
International Search Report, dated May 30, 2017, from corresponding PCT application No. PCT/JP2017/009558.
Girardey et al., "Dynamic Reconfigurable Mixed-Signal Architecture for Safety Critical Applications", 2009 International Conference on Field Programmable Logic and Applications, IEEE, Sep. 2009, pp. 503-506.

* cited by examiner

INFORMATION PROCESSING WITH FAILURE DETECTION, APPARATUS AND METHOD

TECHNICAL FIELD

The present invention relates to an information processing apparatus and method, a computer program, and a recording medium, and particularly relates to an information processing apparatus and method with a failure detection function, a computer program, and a recording medium.

BACKGROUND ART

For this type of apparatus, for example, there is proposed an apparatus in which a light emitting diode (LED) and a light receiving element are arranged around a medical tubing and in which hematocrit of a blood that flows in the medical tubing is measured from a light receiving signal (refer to Patent Literature 1). Alternatively, there is proposed an apparatus configured to apply laser light to a tubing in which a blood flows, and configured to correct a blood flow volume, which is calculated from a Doppler shift of the laser light, on the basis of a blood concentration calculated from an amount of light received by the light receiving element (refer to Patent Literature 2).

There is also proposed an apparatus that is provided with: first and second subsystems to which the same physical quantity is inputted; and a calculation model for estimating an output of the first or second subsystem by modelling and generating a pseudo signal, and that is configured to compare the output of the first or second subsystem and the pseudo signal and to determine which of the first and second subsystems is out of order (refer to Patent Literature 3).

CITATION LIST

Patent Literature

Patent Literature 1: WO 2004/057313 A1
Patent Literature 2: WO 2013/153664 A1
Patent Literature 3: Japanese Patent Application Laid Open No. 2006-228002

SUMMARY OF INVENTION

Technical Problem

For example, if failure detection is required in the medical equipment described in the Patent Literatures 1 and 2, two sets of the same hardware (e.g., processing circuits) are prepared (i.e., duplexing), and outputs of the two sets are compared to detect a failure in many cases, as described in the Patent Literature 3. In the failure detection by duplexing hardware, however, for example, as the processing circuits become more complicated, a manufacturing cost may increase and an apparatus size may increase to mount two sets of the same processing circuits, which is technically problematic.

It is therefore an object of the present invention to provide an information processing apparatus and method that can detect a failure while preventing an increase in the manufacturing cost and the apparatus size, as well as a computer program and a recording medium.

Solution to Problem

The above object of the present invention can be achieved by a first information processing apparatus provided with: a first processor configured to perform a first process on sensor information, which is obtained from a sensor, thereby to generate first information; a second processor configured to perform a second process, which is different from the first process, on the first information, thereby to generate second information; and a third processor configured to perform a third process corresponding to at least a part of the second process, on the first information, thereby to generate third information, and configured to obtain the second information and to output the second information and the third information.

The above object of the present invention can be achieved by a second information processing apparatus provided with: a first processor configured to obtain sensor information from a sensor; a second processor; a third processor; a first signal path for signal transmission via the first processor, the second processor, and the third processor; and a second signal path for signal transmission not via the second processor but via the first processor and the third processor, wherein the third processor (i) is configured to obtain a signal processed by the second processor through the first signal path, and (ii) is configured to obtain a signal processed by the first processor through the second signal path and to simulate at least a part of a process on the second processor.

The above object of the present invention can be achieved by an information processing method in an information processing apparatus including a first processor, a second processor, and a third processor, the information processing method provided with: a process, by the first processor, of performing a first process on sensor information, which is obtained from a sensor, thereby to generate first information; a process, by the second processor, of performing a second process, which is different from the first process, on the first information, thereby to generate second information; a process, by the third processor, of performing a third process corresponding to at least a part of the second process, on the first information, thereby to generate third information; and a process, by the third processor, of obtaining the second information and of outputting the second information and the third information.

The above object of the present invention can be achieved by a computer program for allowing a computer, which is provided in an information processing apparatus, to function as: a first processor configured to perform a first process on sensor information, which is obtained from a sensor, thereby to generate first information; a second processor configured to perform a second process, which is different from the first process, on the first information, thereby to generate second information; and a third processor configured to perform a third process corresponding to at least a part of the second process, on the first information, thereby to generate third information, and configured to obtain the second information and to output the second information and the third information.

The above object of the present invention can be achieved by a recording medium on which the computer program of the present invention is recorded. The effect of the present invention and other benefits will become apparent from the following description of embodiments.

BRIEF DESCRIPTION OF DRAWINGS

FIG. 33 is a flowchart illustrating a process performed by an A/D unit according to the fifth practical example.

FIG. 34 is a flowchart illustrating a process performed by a DSP according to the fifth practical example.

FIG. 35 is a conceptual diagram illustrating a flow of data according to a sixth practical example.

FIG. 36 is a flowchart illustrating a process performed by a DSP according to the sixth practical example.

FIG. 37 is a flowchart illustrating a process performed by a CPU according to the sixth practical example.

FIG. 38 is a conceptual diagram illustrating a flow of data according to a seventh practical example.

FIG. 39 is a flowchart illustrating a process performed by a DSP according to the seventh practical example.

FIG. 40 is a flowchart illustrating a process performed by a CPU according to the seventh practical example.

DESCRIPTION OF EMBODIMENTS

Figure 1:
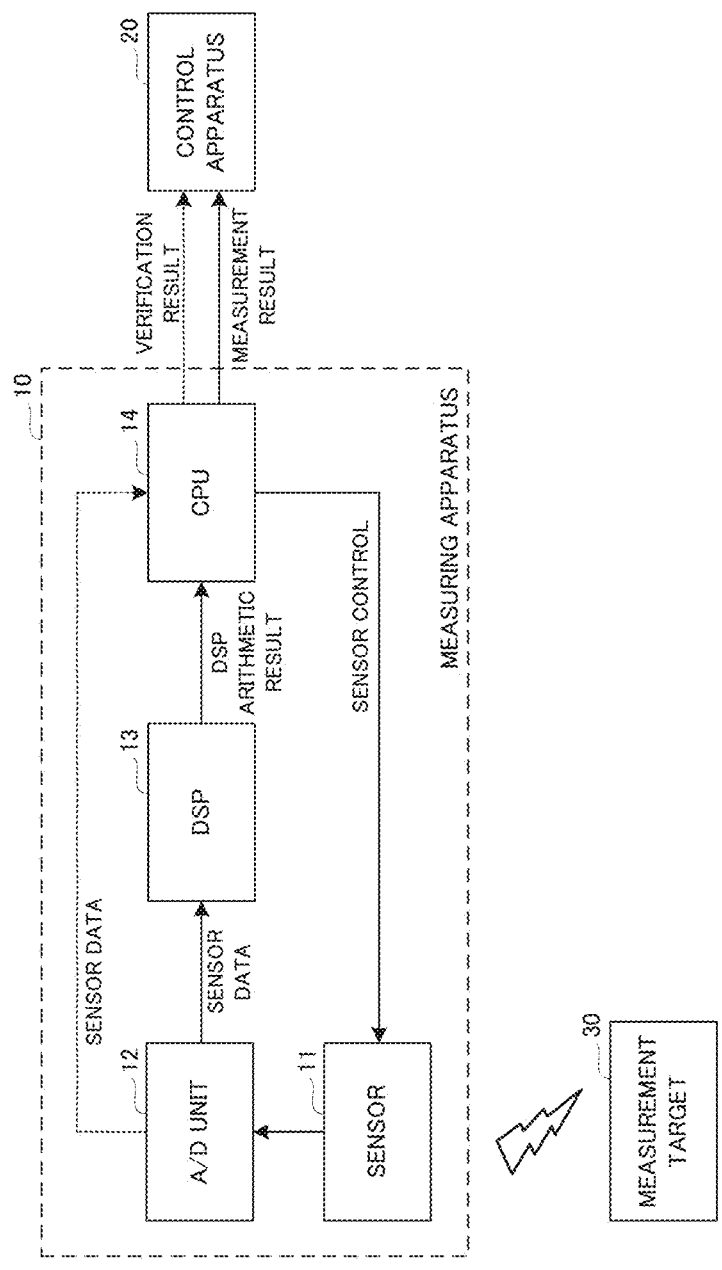
FIG. 1 is a block diagram illustrating a configuration of a measurement system according to a first practical example.

An information processing apparatus and method, a computer program, and a recording medium according to embodiments of the present invention will be explained.

Information Processing Apparatus

First Embodiment

An information processing apparatus according to a first embodiment is provided with: a first processor configured to perform a first process on sensor information, which is obtained from a sensor, thereby to generate first information; a second processor configured to perform a second process, which is different from the first process, on the first information, thereby to generate second information; and a third processor configured to perform a third process corresponding to at least a part of the second process, on the first information, thereby to generate third information, and configured to obtain the second information and to output the second information and the third information.

The first processor, which is provided, for example, with a memory, a processor, and the like, may perform the first process on the sensor data, thereby to generate the first information. The second processor, which is provided, for example, with a memory, a processor, and the like, may perform the second process on the first information, thereby to generate the second information. The third processor, which is provided, for example, with a memory, a processor, and the like, may obtain the second information from the second processor and may output the obtained second information.

On the information processing apparatus, the first information may be inputted to the third processor in addition to the second processor. For example, if the third process corresponds to (i.e., is the same as) the second process, the second process may be performed on the first information as the third process even on the third processor. As a result, the second information may be generated as the third information. Therefore, by comparing the second information generated by the second processor and the second information generated by the third processor as the third information, it is possible to detect whether or not the information processing apparatus is operating normally (in other words, whether or not it is out of order).

If the third process corresponds to a part of the second process, the information processing apparatus may be configured in such a manner that the information that is generated on the second processor when the part of the second process is performed on the first information, is inputted to the third processor in addition to the second information.

On the information processing apparatus, as described above, the first information may be inputted to the third processor, which is configured to obtain the second information from the second processor and to output it, and the third process corresponding to at least a part of the second processor may be performed on the inputted first information. In other words, the information processing apparatus enables the third processor to simulate at least a part of the second process of the second processor. As described above, in the first embodiment, two sets of the same hardware configurations are not provided, but the same process as the second process, or the process corresponding to the part of the second process, may be performed in a dual manner in terms of software.

Therefore, on the information processing apparatus, it is not necessary to provide two sets of the same hardware configurations for the failure detection, and it is thus possible to prevent an increase in the manufacturing cost and the apparatus size. A more remarkable effect may be provided with increasing number of elements that constitute the processor, which is a target of the failure detection, this effect In an aspect of the information processing apparatus according to the first embodiment, the first processor is configured to apply additional information to first information on which the third process is to be performed on the third processor, out of the first information. According to this aspect, it is possible to reduce a load of the third processor in comparison with when the third process is performed by the third processor on all the first information that is outputted from the first processor, which is extremely useful in practice.

In this aspect in which the additional information is applied to the first information, the third processor may be configured to obtain only the first information with the additional information applied, from the first processor. By virtue of such a configuration, it is possible to reduce a communication load between the third processor and the first processor In another aspect of the information processing apparatus according to the first embodiment, the third processor is configured to perform the second process, as the third process, on the first information. According to this aspect, failure detection can be performed by comparing the second information generated by the second processor and the third information, which is the result of the third process.

In the aforementioned aspect in which the additional information is applied to the first information, the second processor may be configured to perform the second process on the first information with the additional information applied, thereby to generate the second information, and is configured to perform a process corresponding to a part of the second process, on the first information with the additional information applied, thereby to generate fourth information, and the third processor may be configured to perform the process corresponding to the part of the second process, as the third process, on the first information with the additional information applied, thereby to generate the third information, and is configured to obtain the fourth information in addition to the second information and to output the second information, the fourth information, and the third information. According to this aspect, it is possible to reduce the load of the third processor caused by the third process. In particular, if the second process is relatively complicated, the load of the third processor caused by the third process can be remarkably reduced, which is extremely useful in practice.

In the aforementioned aspect in which the additional information is applied to the first information, the second processor may be configured to perform a first partial process of the second process on each of a plurality of the first information that are temporally continuous, thereby to generate a plurality of first partial information that are continuous respectively in association with the plurality of first information that are continuous, and may be configured to perform a second partial process of the second process, which is different from the first partial process, on a plurality of first partial information that are continuous and that are a part of the plurality of first partial information that are continuous, thereby to generate second partial information, and the third processor may be configured to perform the first partial process of the second process, as a part of the third process, on the first information with the additional information applied, thereby to generate third partial information as a part of the third information, may be configured to obtain the plurality of first partial information and to output first partial information corresponding to the first information with the additional information applied, out of the plurality of first partial information, and the third partial information, may be configured to perform the second partial process of the second process, as another part of the third process, on a plurality of first partial information excluding the first partial information corresponding to the first information with the additional information applied, out of the plurality of first partial information that are continuous and that are the part, thereby to generate fourth partial information as another part of the third information, and may be configured to obtain the second partial information and to output the second partial information and the fourth partial information.

The second process according to this aspect may include (i) a process of performing the first partial process on each of, for example, N1 first information that are temporally continuous (wherein N1 is a natural number), thereby to generate N1 first partial information that are continuous, and (ii) a process of extracting, for example, N2 first partial information that are continuous (wherein N2 is a natural number smaller than N1) from the N1 first partial information, and of performing the second partial process on the extracted N2 first partial information, thereby to generate one second partial information.

The third processor may perform the first partial process of the second process, as a part of the third process, on the first information with the additional information applied, thereby to generate the third partial information. By comparing the third partial information and the first partial information corresponding to the first information with the additional information applied, which is used to generate the third partial information, out of the N1 first partial information, the failure detection can be performed for the aforementioned process (i).

The third process may further perform the second partial process of the second process, as another part of the third process, on the third partial information and (N2−1) first partial information excluding the first partial information corresponding to the first information with the additional information applied, which is used to generate the third partial information, out of the extracted N2 first partial information, thereby to generate the fourth partial information. By comparing the fourth partial information and the second partial information, the failure detection can be performed for the aforementioned process (ii). Here, in particular, when generating the fourth partial information, a part of the result of the first partial process of the second process on the second processor is used, and it is thus possible to reduce the load of the third process.

In another aspect of the information processing apparatus according to the first embodiment, (I) the second processor (I-i) is configured to perform a first partial process of the second process on each of a plurality of the first information that are temporally continuous, thereby to generate a plurality of first partial information that are continuous respectively in association with the plurality of first information that are continuous, and (I-ii) is configured to perform a second partial process of the second process, which is different from the first partial process, on a plurality of first partial information that are continuous and that are a part of the plurality of first partial information that are continuous, thereby to generate second partial information, and (II) the third processor (II-i) is configured to obtain the plurality of first partial information that are continuous and that are the part, and to perform the second partial process of the second process as a part of the third process, thereby to generate fifth partial information as a part of the third information, and (II-ii) is configured to obtain the second partial information and to output the second partial information and the fifth partial information, and the second processor is configured to output the plurality of first partial information that are continuous and that are the part, to the third processor if it is requested from the third processor.

According to this aspect, even if the additional information is not applied to the first information used when the first partial information is generated on the second processor, it is possible to perform the failure detection for the second partial process of the second processor by comparing the fifth partial information and the second partial information. Here, in particular, the second processor may output the plurality of first partial information to the third processor if it is requested from the third processor. It is thus possible to reduce a storage capacity for the third processor to store the first partial information outputted from the second processor or the like.

In another aspect of the information processing apparatus according to the first embodiment, the third processor is configured to obtain the first information via the second processor. According to this aspect, it is not necessary to separately provide, for example, a path or the like for connecting the first processor and the third process, in order that the third process obtains the first information. It is thus extremely useful in practice.

In another aspect of the information processing apparatus according to the first embodiment, the second processor is configured to apply additional information to second information, which is generated by performing the second process on first information on which the third process is to be performed by the third processor, out of the first information. According to this aspect, it is possible to relatively easily specify the second information that is to be compared with the third information, which is generated by performing the third process on the first information.

In another aspect of the information processing apparatus according to the first embodiment, the second processor is configured to divide first information that is to be outputted to the third processor, into a plurality of sixth partial information and to output the plurality of sixth partial information to the third processor. According to this aspect, when the first information is transmitted to the third processor via the second processor, it is possible to prevent a delay in the transmission of the second information from the second processor to the third processor Second Embodiment An information processing apparatus according to a second embodiment is provided with: a first processor configured to obtain sensor information from a sensor; a second processor; a third processor; a first signal path for signal transmission via the first processor, the second processor, and the third processor; and a second signal path for signal transmission not via the second processor but via the first processor and the third processor. The third processor (i) is configured to obtain a signal processed by the second processor through the first signal path, and (ii) is configured to obtain a signal processed by the first processor through the second signal path and to simulate at least a part of a process on the second processor.

Even on the information processing apparatus according to the second embodiment, as in the information processing apparatus according to the first embodiment, at least a part of the process on the second processor may be performed in a dual manner in terms of software. Therefore, according to the information processing apparatus in the second embodiment, as in the information processing apparatus according to the first embodiment, it is possible to perform the failure detection while preventing an increase in the manufacturing cost and the apparatus size.

(Information Recording Method)

An information recording method according to an embodiment is an information processing method in an information processing apparatus including a first processor, a second processor, and a third processor. The information processing method is provided with: a process, by the first processor, of performing a first process on sensor information, which is obtained from a sensor, thereby to generate first information; a process, by the second processor, of performing a second process, which is different from the first process, on the first information, thereby to generate second information; a process, by the third processor, of performing a third process corresponding to at least a part of the second process, on the first information, thereby to generate third information; and a process, by the third processor, of obtaining the second information and of outputting the second information and the third information.

According to the information processing method in the embodiment, as in the information processing apparatus according to the first embodiment, it is possible to perform the failure detection while preventing an increase in the manufacturing cost and the apparatus size. The information processing method according to the embodiment can also adopt the same various aspects as those of the information processing apparatus according to the first embodiment described above.

(Computer Program)

A computer program according to an embodiment allows a computer, which is provided in an information processing apparatus, to function as: a first processor configured to perform a first process on sensor information, which is obtained from a sensor, thereby to generate first information; a second processor configured to perform a second process, which is different from the first process, on the first information, thereby to generate second information; and a third processor configured to perform a third process corresponding to at least a part of the second process, on the first information, thereby to generate third information, and configured to obtain the second information and to output the second information and the third information.

According to the computer program in the embodiment, the information processing apparatus according to the first embodiment described above can be relatively easily realized by allowing the computer, which is provided in the information processing apparatus, to execute the computer program. As a result, according to the computer program in the embodiment, as in the information processing apparatus according to the first embodiment described above, it is possible to perform the failure detection while preventing an increase in the manufacturing cost and the apparatus size.

(Recording Medium)

On a recording medium according to an embodiment, the computer program according to the embodiment described above is recorded. The information processing apparatus according to the first embodiment described above can be relatively easily realized as the computer provided in the information processing apparatus reads and executes the computer program recorded on a compact disc read only memory (CD-ROM), a DVD read only memory (DVD-ROM), or the like, which is an example of the recording medium according to the embodiment. As a result, according to the recording medium in the embodiment, as in the information processing apparatus according to the first embodiment described above, it is possible to perform the failure detection while preventing an increase in the manufacturing cost and the apparatus size.

PRACTICAL EXAMPLES

An information processing apparatus according to practical examples of the present invention will be explained with reference to the drawings. In the practical examples below, a measurement system provided with the information processing apparatus according to the present invention will be exemplified.

First Practical Example

A measurement system according to a first practical example will be explained with reference to FIG. 1 to FIG. 7.

(Configuration of Measurement System)

A configuration of the measurement system according to the first practical example will be explained with reference to FIG. 1. FIG. 1 is a block diagram illustrating the configuration of the measurement system according to the first practical example.

In FIG. 1, the measurement system is provided with a measuring apparatus 10, which is an example of the information processing apparatus according to the present invention, and a control apparatus 20. The measuring apparatus 10 is provided with a sensor 11, an analog/digital (A/D) unit 12, a digital signal processor (DSP) 13, and a central processing unit (CPU) 14.

The sensor 11 is configured to output analog data associated with a measurement target 30, which is, for example, a skin or a blood of a living body, or the like. A configuration of the sensor 11 may be determined, as occasion demands, in accordance with the measurement target 30. The A/D unit 12 is configured to perform an A/D conversion on the analog data outputted from the sensor 11, and is configured to output sensor data as digital data. The DSP 13 is configured to perform a predetermined arithmetic process on the sensor data outputted from the A/D unit 12, and is configured to output an arithmetic result as data indicating a measurement result.

The CPU 14 is configured to integrally control the measuring apparatus 10. Specifically, the CPU 14 may control, for example, the sensor 11 so that the measurement target 30 can be appropriately measured. The CPU 14 is configured to transmit the data indicating the measurement result, which is outputted from the DSP 13, to the control apparatus 20. Alternatively, the CPU 14 is configured to control communication between the measuring apparatus 10 and the control apparatus 20. Particularly in the first practical example, the CPU 14 is configured to simulate a process of the DSP 13 by using the sensor data outputted from the A/D unit 12 (the details of which will be described later).

The control apparatus 20 is configured to receive the data indicating the measurement result from the measuring apparatus 10, and is configured, for example, to display the measurement result on a display (not illustrated) or to control the measurement system. Particularly in the first practical example, the control apparatus 20 is configured to perform a failure determination of the measuring apparatus 10 by comparing the data indicating the measurement result and data generated by that the CPU 14 simulates (or verifies) the process of the DSP 13.

The "A/D unit 12", the "DSP 13", and the "CPU 14" are respectively an example of the "first processor", the "second processor", and the "third processor" according to the present invention. A flow of the data via the A/D unit 12, the DSP 13, and the CPU 14 in FIG. 1 is an example of the "first signal path" according to the present invention. In FIG. 1, a flow of the data indicated by a dotted line arrow directed from the A/D unit 12 to the CPU 14 is an example of the "second signal path" according to the present invention.

Next, the data outputted from each of the A/D unit 12, the DSP 13, and the CPU 14 will be explained with reference to FIG. 2.

Figure 2:
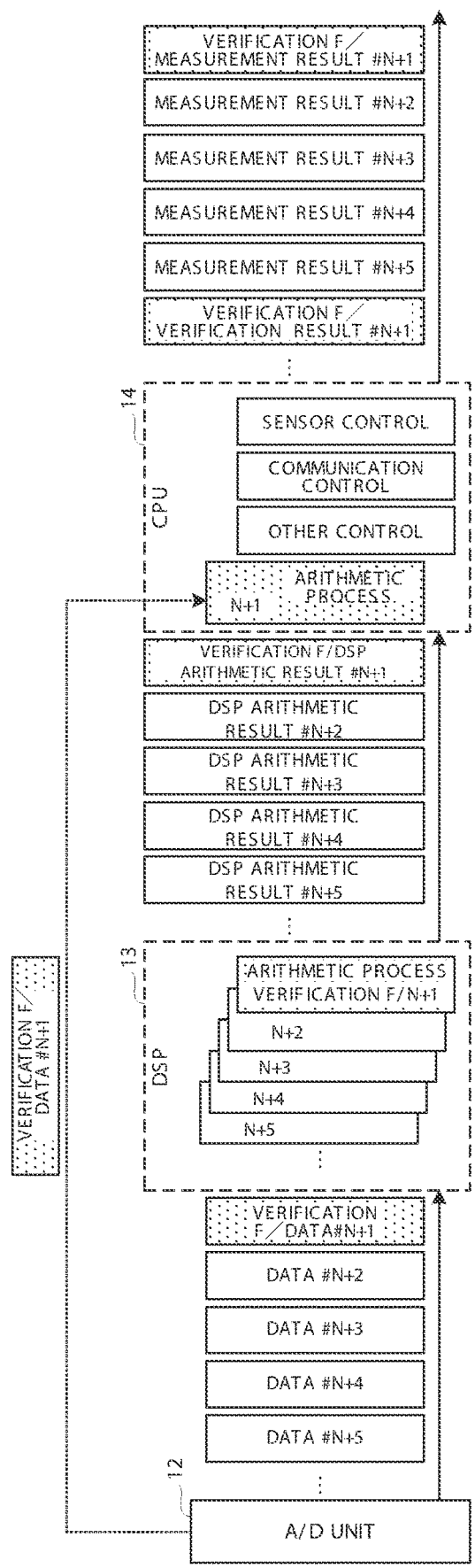
FIG. 2 is a conceptual diagram illustrating a flow of data according to the first practical example.

In FIG. 2, the A/D unit 12 applies an ID to each digital data after the A/D conversion and generates the sensor data. If there is a verification request described later from the DSP 13, the A/D unit 12 generates the sensor data with a verification flag applied (refer to "VERIFICATION F/DATA #N+1" in FIG. 2). The sensor data with the verification flag applied is transmitted to each of the DSP 13 and the CPU 14. Note that "#N+1", "#N+2" and so on in FIG. 2 are signs indicating a flow of data (e.g., time series) and are different from the aforementioned ID.

The DSP 13 performs the predetermined arithmetic process on the sensor data and outputs the arithmetic result as the data indicating the measurement result, as described above. Here, the DSP 13 applies the verification flag, to the arithmetic result associated with the sensor data with the verification flag applied (refer to "VERIFICATION F/DSP ARITHMETIC RESULT #N+1" in FIG. 2).

The CPU 14 transmits the arithmetic result outputted from the DSP 13, to the control apparatus 20 as a measurement result. The CPU 14 further performs the same arithmetic process as that performed by the DSP 13 on the sensor data, on the sensor data with the verification flag applied, which is outputted from the A/D unit 12, applies the verification flag to resulting data, and transmits it to the control apparatus 20 as a verification result (refer to "VERIFICATION F/VERIFICATION RESULT #N+1" in FIG. 2).

Among the functions of the CPU 14, a function of transmitting the measurement result to the control apparatus 20 is referred to as a "transmission processor of the CPU 14" for convenience. Moreover, among the functions of the CPU 14, a function of performing verification and of transmitting the verification result to the control apparatus 20 is referred to as a "verification processor of the CPU 14" for convenience.

(Operations of Measurement System)

Next, operations of each of the A/D unit 12, the DSP 13, the CPU 14, and the control apparatus 20 will be explained with reference to flowcharts in FIG. 3 to FIG. 7.

Operations of A/D Unit 12

Figure 3:
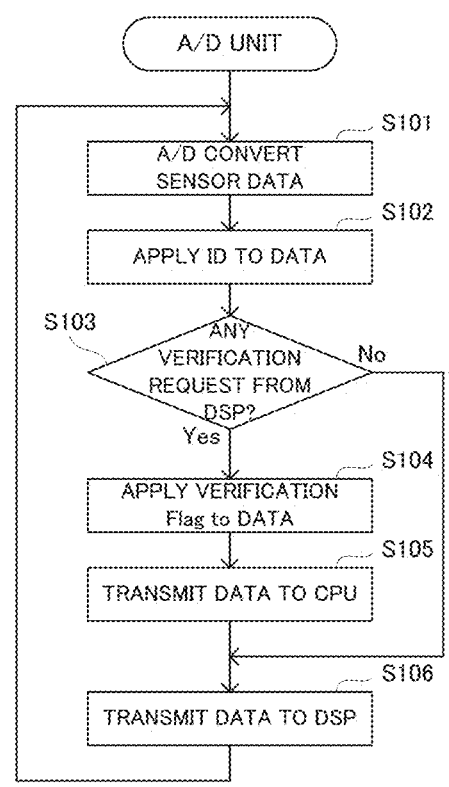
FIG. 3 is a flowchart illustrating a process performed by an A/D unit according to the first practical example.

In FIG. 3, the A/D unit 12 performs the A/D conversion on the analog data outputted from the sensor 11 (step S101), and applies an ID to the digital data after the A/D conversion and generates the sensor data (step S102).

The A/D unit 12 then determines whether or not there is a verification request from the DSP 13 (i.e., whether or not a signal indicating a verification request is received) (step S103). In this determination, if it is determined that there is no verification request (the step S103: No), a step S106 described later is performed.

On the other hand, in the determination in the step S103, if it is determined that there is the verification request (the step S103: Yes), the A/D unit 12 applies a verification flag to the sensor data (step S104). The A/D unit 12 then transmits the sensor data with the verification flag applied, to the CPU 14 (step S105).

The A/D unit 12 then transmits the sensor data (including the sensor data with the verification flag applied), to the DSP 13 (step S106). The process illustrated in FIG. 3 is repeated with a first predetermined period in operation of the measurement system.

Operations of DSP 13

Figure 4:
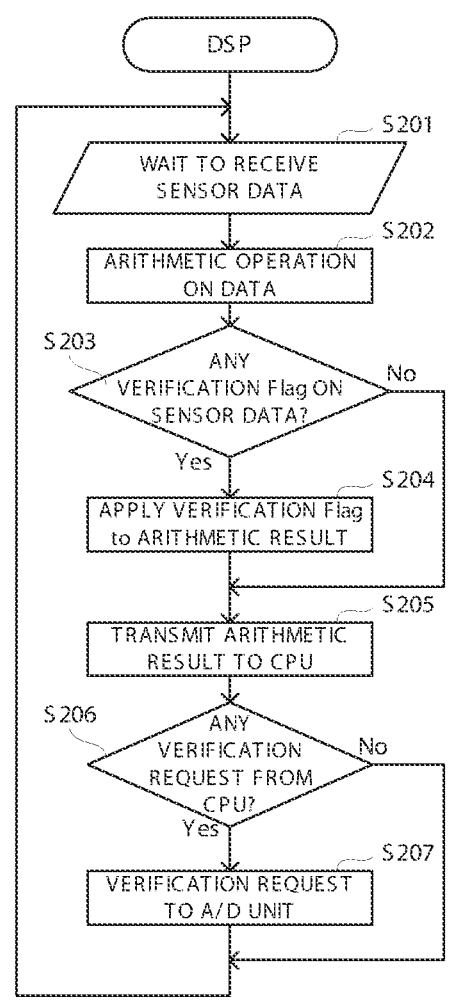
FIG. 4 is a flowchart illustrating a process performed by a DSP according to the first practical example.

In FIG. 4, the DSP 13 is in a standby state until receiving the sensor data from the A/D unit 12 (step S201). When receiving the sensor data, the DSP 13 performs the predetermined arithmetic process on the received sensor data and generates an arithmetic result (step S202).

The DSP 13 then determines whether or not the verification flag is applied to the sensor data (step S203). In this determination, if it is determined that the verification flag is not applied (the step S203: No), a step S205 described later is performed.

On the other hand, if it is determined that the verification flag is applied (the step S203: Yes), the DSP 13 applies the verification flag to the arithmetic result (step S204). The DSP 13 then transmits the arithmetic result (including the arithmetic result with the verification flag applied) to the CPU 14.

The DSP 13 then determines whether or not there is a verification request from the CPU 14 (i.e., whether or not a signal indicating a verification request is received) (step S206). In this determination, if it is determined that there is no verification request (the step S206: No), the process is repeated from the step S201.

On the other hand, in the determination in the step S206, if it is determined that there is the verification request (the step S206: Yes), the DSP 13 transmits the signal indicating the verification request, to the A/D unit 12 (step S207). Then, the process is repeated from the step S201.

Transmission Process of CPU 14

Figure 5:
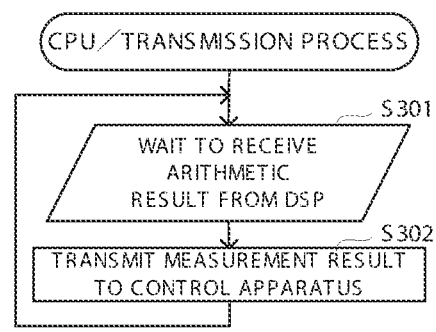
FIG. 5 is a flowchart illustrating a transmission process performed by a CPU according to the first practical example.

In FIG. 5, the transmission processor of the CPU 14 is in a standby state until receiving the arithmetic result from the DSP 13 (step S301). When receiving the arithmetic result, the transmission processor of the CPU 14 transmits the arithmetic result to the control apparatus 20 as a measurement result (step S302). At this time, the arithmetic result with the verification flag applied may be transmitted to the control apparatus 20 as a measurement result with the verification flag applied. Then, the process is repeated from the step S301.

Verification Process of CPU 14

Figure 6:
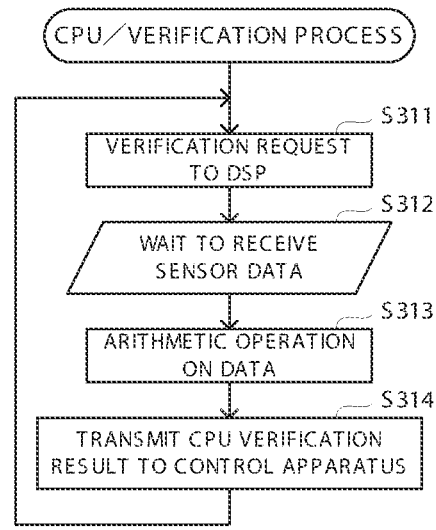
FIG. 6 is a flowchart illustrating a verification process performed by the CPU according to the first practical example.

In FIG. 6, the verification processor of the CPU 14 transmits a signal indicating a verification request, to the DSP 13 (step S311). The verification processor of the CPU 14 then becomes in a standby state until receiving the sensor data with the verification flag applied, from the A/D unit 12 (step S312).

When receiving the sensor data with the verification flag applied, the verification processor of the CPU 14 performs the same arithmetic process as that performed by the DSP 13 on the sensor data, on the received sensor data, and generates a verification result (step S313). The verification processor of the CPU 14 then applies the verification flag to the generated verification result and transmits it to the control apparatus 20 (step S314). Then, the process is repeated from the step S311.

Operations of Control Apparatus

Figure 7:
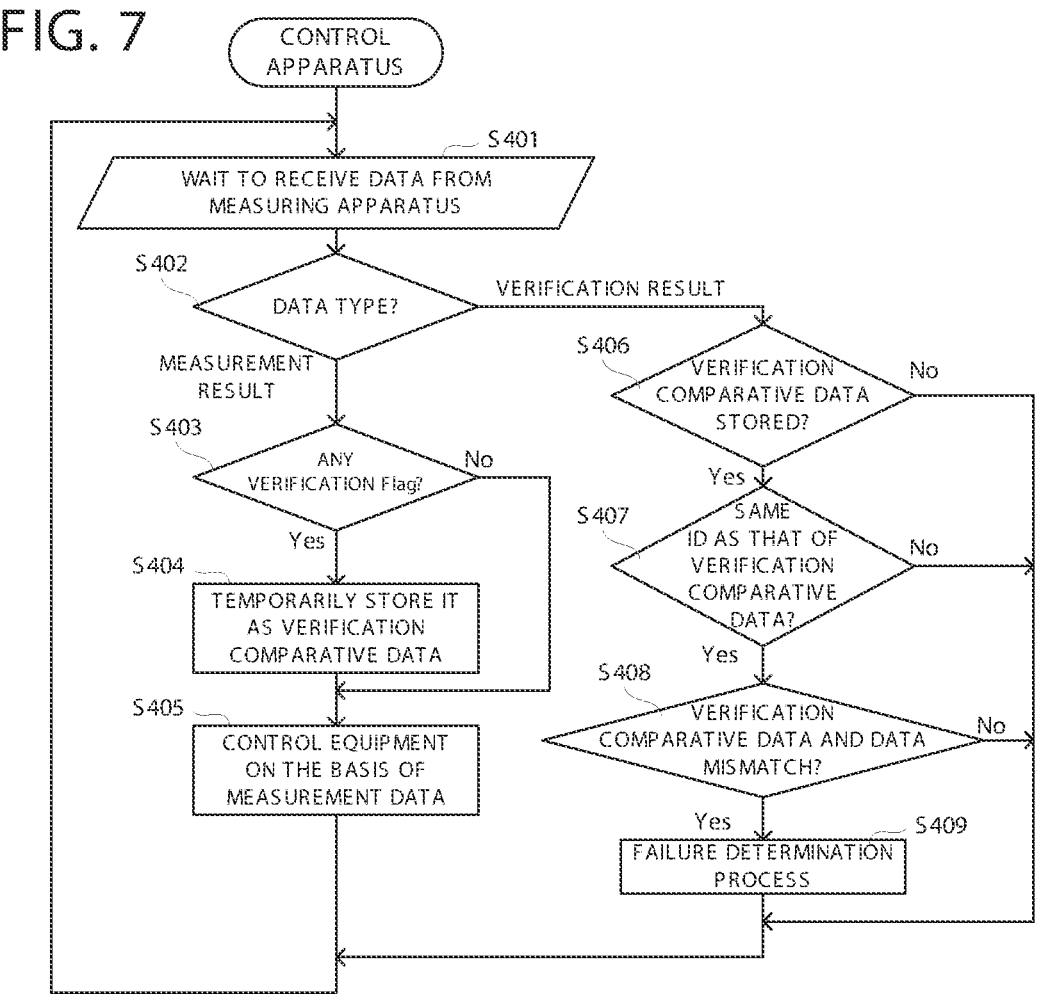
FIG. 7 is a flowchart illustrating a process performed by a control apparatus according to the first practical example.

In FIG. 7, the control apparatus 20 is in a standby state until receiving the measurement result or the verification result from the CPU 14 (step S401). When receiving the measurement result or the verification result, the control apparatus 20 determines a type of the received data (step S402). In this determination, if it is determined that it is the measurement result, the control apparatus 20 determines whether or not the verification flag is applied to the received measurement result (step S403). In this determination, if it is determined that the verification flag is not applied (the step S403: No), a step S405 described later is performed.

On the other hand, in the determination in the step S403, if it is determined that the verification flag is applied (the step S403: Yes), the control apparatus 20 temporarily stores the measurement result with the verification flag applied, for example, in a memory (not illustrated) or the like, as verification comparative data (step S404).

The control apparatus 20 then controls the measurement system on the basis of the measurement result (step S405). Then, the process returns to the step S401.

In the determination in the step S402, if it is determined that it is the verification result, the control apparatus 20 determines whether or not the verification comparative data is stored (step S406). In this determination, if it is determined that the verification comparative data is not stored (the step S406: No), the process returns to the step S401.

On the other hand, in the determination in the step S406, if it is determined that the verification comparative data is stored (the step S406: Yes), the control apparatus 20 determines whether or not the ID of the verification comparative data and the ID of the received verification result are identical (step S407). In this determination, if it is determined that the IDs are not identical (the step S407; No), the process returns to the step S401.

On the other hand, in the determination in the step S407, if it is determined that the IDs are identical (the step S407; Yes), the control apparatus 20 determines whether or not the measurement result with the verification flag applied, which is the verification comparative data, and the received verification result mismatch (step S408). In this determination, if it is determined that they do not mismatch (i.e., if the measurement result with the verification flag applied matches the verification result) (the step S408: No), the measurement system is normal, and thus the process returns to the step S401.

On the other hand, in the determination in the step S408, if it is determined that they mismatch (the step S408: Yes), the control apparatus 20 performs a failure determination process, such as, for example, sounding an alarm (step S409). The failure determination process may be set, as occasion demands.

(Technical Effect)

On the CPU 14, the same arithmetic process as that performed by the DSP 13 on the sensor data is performed on the sensor data with the verification flag applied, and the verification result is generated. The failure detection can be performed by comparing the verification result and the measurement result with the verification flag applied, which is outputted from the DSP 13.

Here, as described above, the CPU 14 not only generates the verification result, but also controls the sensor 11 or transmits the measurement result or the like to the control apparatus 20. Thus, a processing capacity or throughput of the CPU 14 for generating the verification result is inferior to that of the DSP 13. If the CPU 14 is used to generate verification results for all the sensor data, a relatively long period may be required from when one measurement result is generated on the DSP 13 to when a verification result corresponding to the one measurement result is generated on the CPU 14. Then, for example, the measurement of the measurement target 30 may be continued even though there is a failure on the measuring apparatus.

In the first practical example, the verification result is generated only for the sensor data with the verification flag applied. It is thus possible to set a relatively short period from when one measurement result is generated on the DSP 13 to when a verification result corresponding to the one measurement result is generated on the CPU 14. In other words, it is possible to improve real-time properties of the failure detection.

Particularly in the first practical example, the CPU 14 transmits the signal indicating the verification request to the DSP 13, by which the A/D unit 12 applies the verification flag to the sensor data (refer to S311 in FIGS. 6, S206 and S207 in FIG. 4, and S103 to S105 in FIG. 3). It is thus possible to prevent the sensor data that is not processed, from being stored in the CPU 14.

The verification process may be performed as one of a plurality of processes performed in parallel by the CPU 14. In other words, in the first practical example, another DSP with the same processing capacity as that performed by the DSP 13 is not separately provided to perform the failure detection, but a part of the processing capacity of the CPU 14 is allotted to the verification process. It is thus possible to prevent an increase in the manufacturing cost and the apparatus size, in comparison with when the hardware is duplexed to perform the failure detection.

In addition, it is not necessary to synchronize the arithmetic process on the DSP 13 and the verification process on the CPU 14, and thus, data transmission between the A/D unit 12 and the CPU 14 does not require as a high transmission speed as that of data transmission between the A/D unit 12 and the DSP 13. Thus, the data transmission between the A/D unit 12 and the CPU 14 can adopt relatively inexpensive serial communication (e.g., universal asymchronous receiver transmitter (UART)), and the manufacturing cost can be further reduced. Meanwhile, since the ID is applied to each sensor data by the A/D unit 12, data synchronization between the arithmetic result from the DSP 13 and the verification result from the CPU 14 is ensured.

The "A/D conversion", the "predetermined arithmetic process on the DSP 13", and the "arithmetic process on the CPU 14" according to the first practical example are respectively an example of the "first process", the "second process", and the "third process" according to the present invention. The "sensor data", the "arithmetic result (or the measurement result)", the "verification result", and the "verification flag" according to the first practical example are respectively an example of the "first information", the "second information", the "third information", and the "additional information" according to the present invention.

Second Practical Example

A measurement system according to a second practical example will be explained with reference to FIG. 8 to FIG. 12. The second practical example is the same as the aforementioned first practical example, except a part of the processes of the DSP 13, the CPU 14, and the control apparatus 20 is different. Thus, in the second practical example, the same explanation as that in the first practical example will be omitted, and the same reference numerals will carry in the same parts in the drawings. An explanation will be given only to basically different points with reference to FIG. 8 to FIG. 12.

The data outputted from each of the DSP 13 and the CPU 14 will be explained with reference to FIG. 8.

The DSP 13 performs the predetermined arithmetic process on the sensor data and outputs the arithmetic result. Here, regarding the sensor data with the verification flag applied, the DSP 13 outputs the arithmetic result of a part of the arithmetic process (e.g., a former half) (i.e., an arithmetic result indicating an interim progress: "PART OF CALCULATION" in FIG. 8) (refer to "DSP VERIFICATION RESULT #N+1" in FIG. 8).

Figure 8:
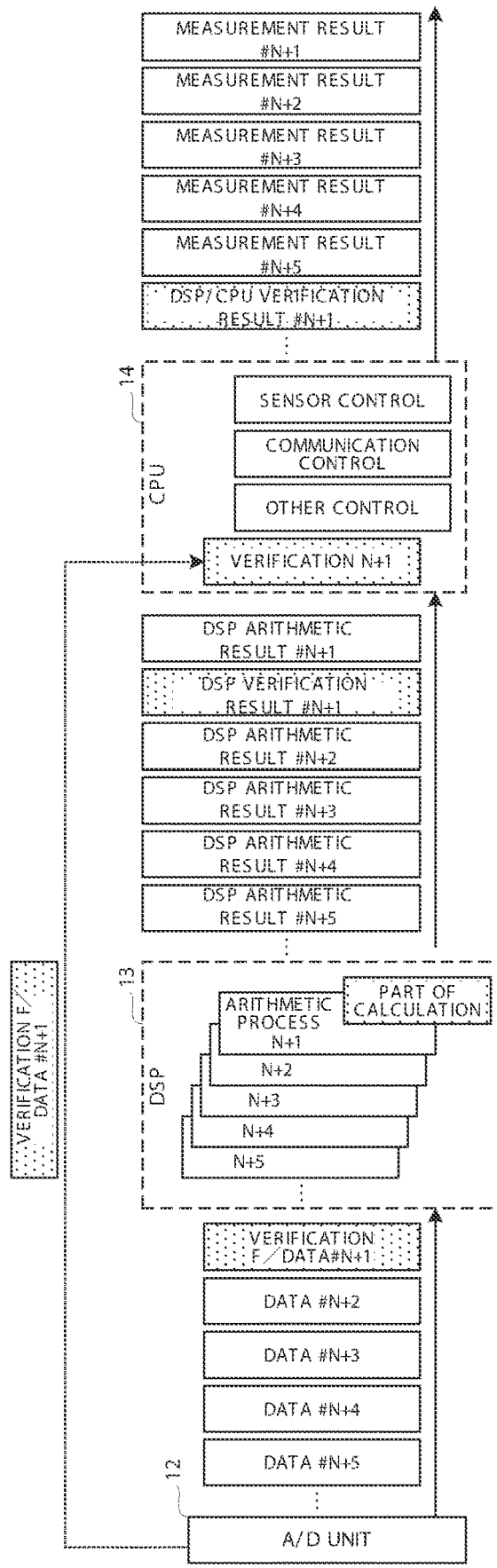
FIG. 8 is a conceptual diagram illustrating a flow of data according to a second practical example.

The CPU 14 performs the same arithmetic process as the part of the arithmetic process performed by the DSP 13 on the sensor data, on the sensor data with the verification flag applied, which is outputted from the A/D unit 12, and transmits resulting data and the verification result outputted from the DSP 13 to the control apparatus 20 as one data (refer to "DSP/CPU VERIFICATION RSEULT #N+1" in FIG. 8).

(Operations of Measurement System)

Next, operations of each of the DSP 13, the CPU 14, and the control apparatus 20 will be explained with reference to flowcharts in FIG. 9 to FIG. 12.

Operations of DSP 13

Figure 9:
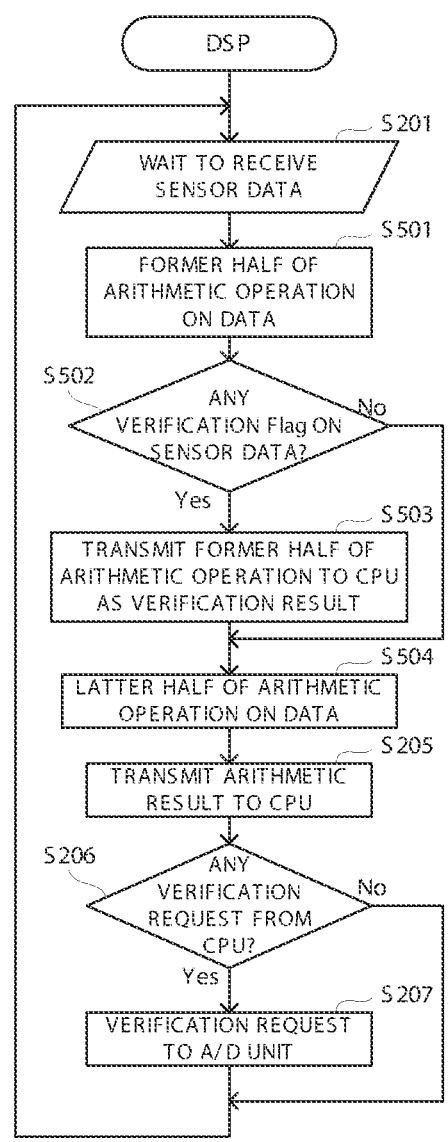
FIG. 9 is a flowchart illustrating a process performed by a DSP according to the second practical example.

In FIG. 9, when receiving the sensor data, the DSP 13 performs a former half of the predetermined arithmetic process on the received sensor data and generates a partial arithmetic result, which is the result of the former half (step S501).

The DSP 13 then determines whether or not the verification flag is applied to the sensor data (step S502). In this determination, if it is determined that the verification flag is not applied (the step S502: No), a step S504 described later is performed.

On the other hand, in the determination in the step S502, if it is determined that the verification flag is applied (the step S502: Yes), the DSP 13 transmits the partial arithmetic result to the CPU 14 as a verification result (step S503).

The DSP 13 performs a latter half of the predetermined arithmetic process on the received sensor data and generates an arithmetic result (step S504). The DSP 13 then transmits the arithmetic result to the CPU 14. The steps S503 and S504 may be performed in parallel.

Transmission Process of CPU 14

Figure 10:
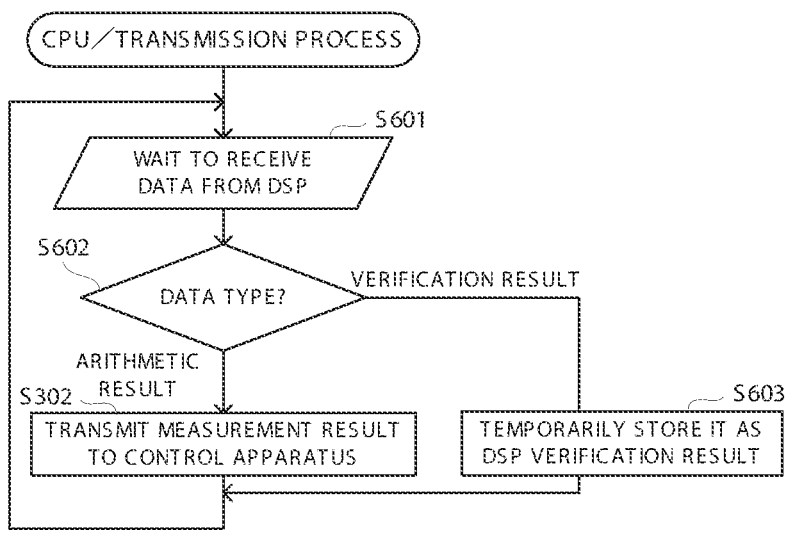
FIG. 10 is a flowchart illustrating a transmission process performed by a CPU according to the second practical example.

In FIG. 10, the transmission processor of the CPU 14 is in a standby state until receiving the arithmetic result or the verification result from the DSP 13 (step S601). When receiving the data, the transmission processor of the CPU 14 determines a type of the received data (step S602). In this determination, if it is determined that it is the arithmetic result, the transmission processor of the CPU 14 transmits the arithmetic result to the control apparatus 20 as a measurement result (the step S302). Then, the process is repeated from the step S601.

On the other hand, in the determination in the step S602, if it is determined that it is the verification result, the transmission processor of the CPU 14 temporarily stores the verification result, for example, in a memory or the like, as a DSP verification result (step S603). Then, the process is repeated from the step S601.

Verification Process of CPU 14

Figure 11:
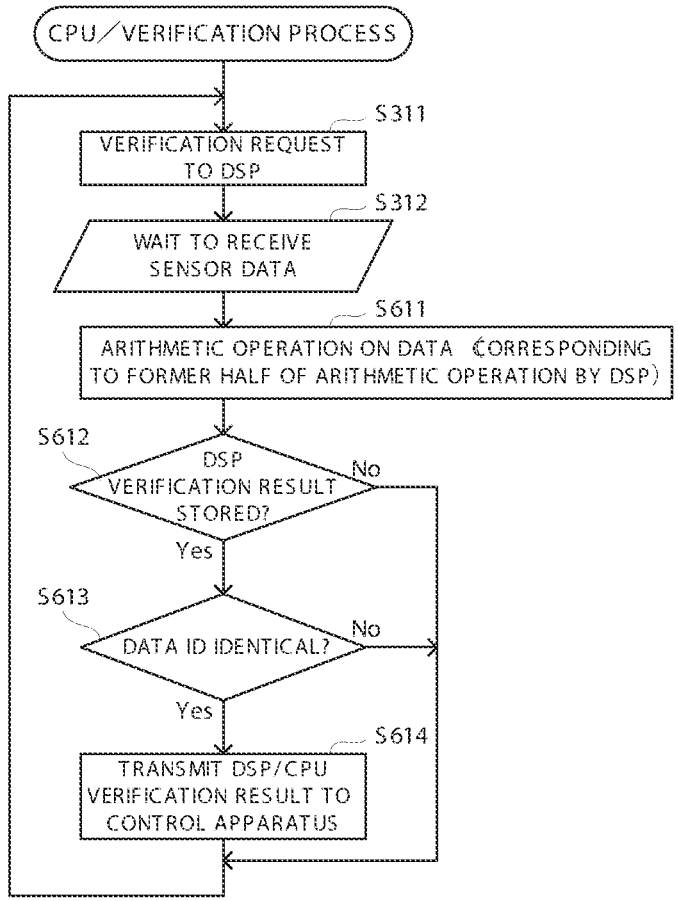
FIG. 11 is a flowchart illustrating a verification process performed by the CPU according to the second practical example.

In FIG. 11, when receiving the sensor data with the verification flag applied, the verification processor of the CPU 14 performs the same arithmetic process as the former half of the predetermined arithmetic process, which is performed by the DSP 13 on the sensor data, on the received sensor data, and generates a CPU verification result (step S611). The verification processor of the CPU 14 then applies the verification flag to the generated verification result and transmits it to the control apparatus 20 (step S314). Then, the process is repeated from the step S311.

The verification processor of the CPU 14 then determines whether or not the DSP verification result is stored (step S612). In this determination, if it is determined that the DSP verification result is not stored (the step S612: No), the step S311 is performed.

On the other hand, in the determination in the step S612, if it is determined that the DSP verification result is stored (the step S612: Yes), the verification processor of the CPU 14 determines whether or not the ID of the DSP verification result and the ID of the CPU verification result are identical (step S613). In this determination, if it is determined that the IDs are not identical (the step S603; No), the step S311 is performed.

On the other hand, in the determination in the step S613, if it is determined that the IDs are identical (the step S603; Yes), the verification processor of the CPU 14 transmits the DSP verification result and the CPU verification result to the control apparatus 20 as one data (step S614). Then, the step S311 is performed.

Operations of Control Apparatus

Figure 12:
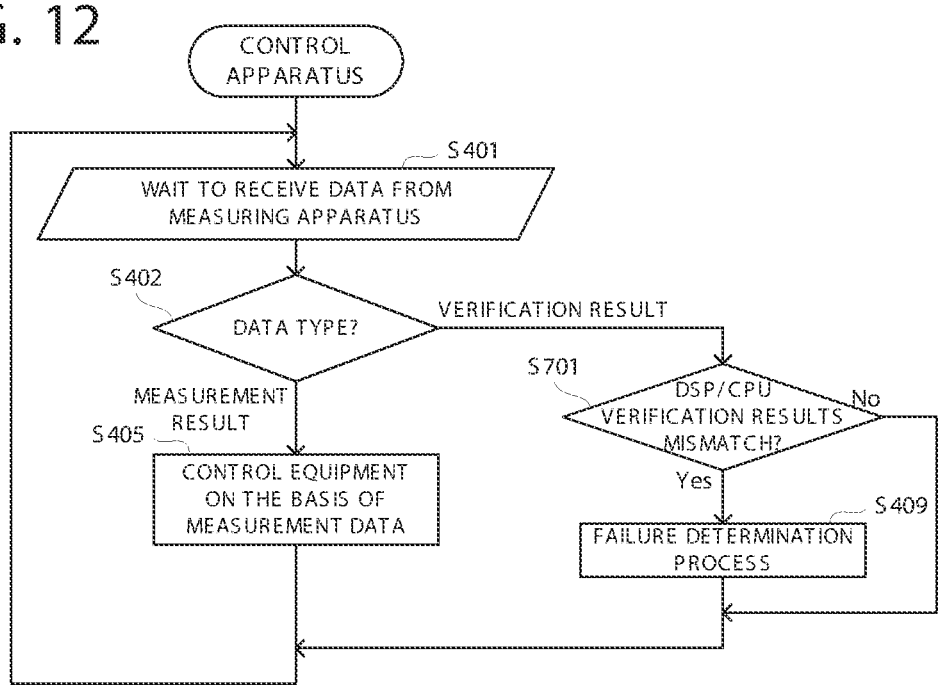
FIG. 12 is a flowchart illustrating a process performed by a control apparatus according to the second practical example.

In FIG. 12, in the determination in the step S402, if it is determined that it is the measurement result, the control apparatus 20 controls the measurement system on the basis of the measurement result (the step S405). Then, the process returns to the step S401.

On the other hand, in the determination in the step S402, if it is determined that it is the verification result, the control apparatus 20 determines whether or not the DSP verification result and the CPU verification result mismatch (step S701). In this determination, if it is determined that they do not mismatch (i.e., if the DSP verification result matches the CPU verification result) (the step S701: No), the measurement system is normal, and thus the process returns to the step S401.

On the other hand, in the determination in the step S701, if it is determined that they mismatch (the step S701: Yes), the control apparatus 20 performs the failure determination process (the step S409).

The "former half of the arithmetic process" and the "partial arithmetic result (DSP verification result)" according to the second practical example are respectively an example of the "part of the second process" and the "fourth information" according to the present invention.

Third Practical Example

A measurement system according to a third practical example will be explained with reference to FIG. 13 to FIG. 16. The third practical example is the same as the aforementioned second practical example, except a part of the processes of the DSP 13 and the CPU 14 is different. Thus, in the third practical example, the same explanation as those in the first and second practical examples will be omitted, and the same reference numerals will carry in the same parts in the drawings. An explanation will be given only to basically different points with reference to FIG. 13 to FIG. 16.

Figure 13:
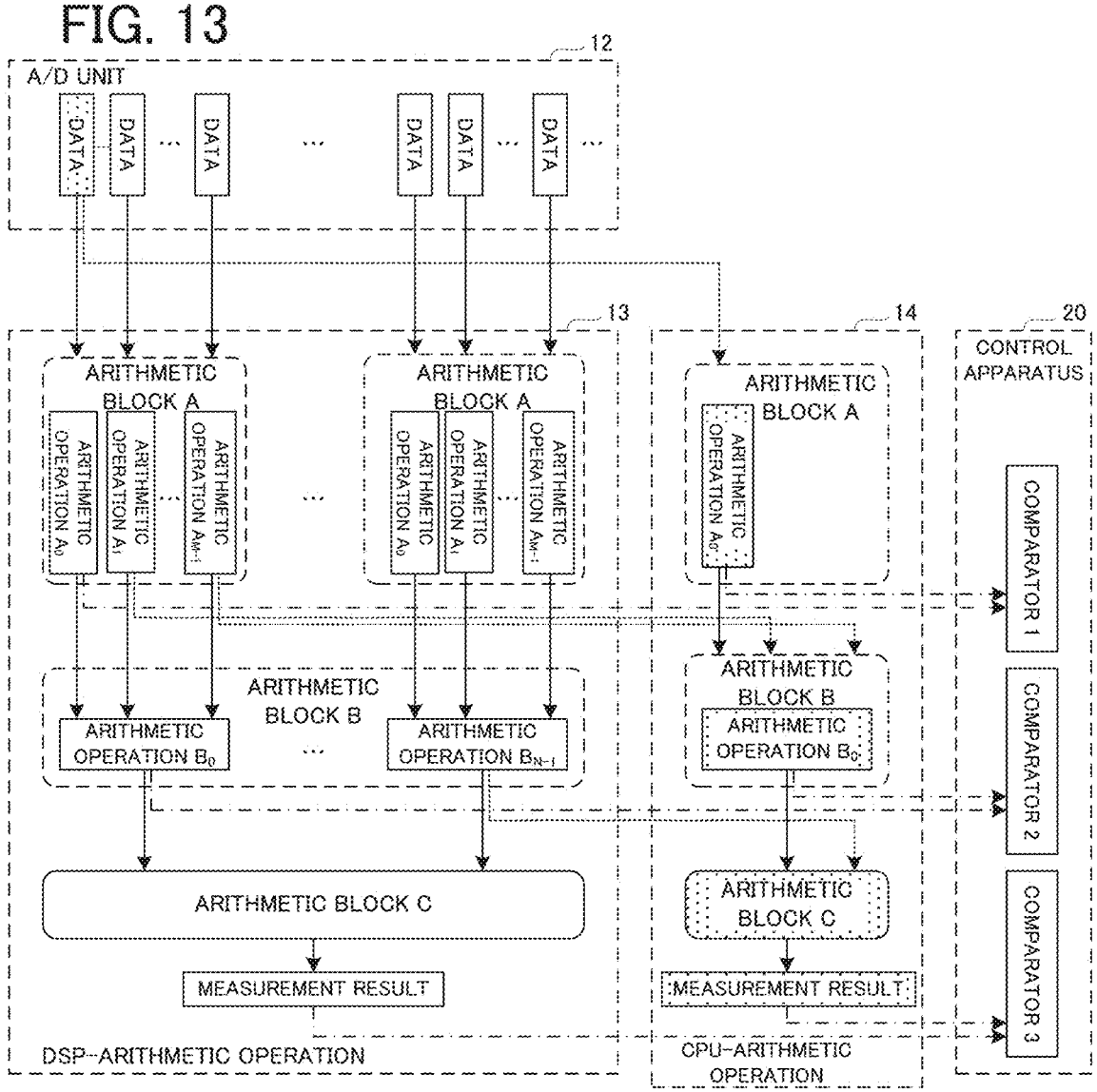
FIG. 13 is a conceptual diagram illustrating a flow of data according to a third practical example.

The data outputted from each of the DSP 13 and the CPU 14 will be explained with reference to FIG. 13. The "data"

hatched in FIG. 13 is the sensor data with the verification data applied. Each of an "arithmetic operation $A_0$", an "arithmetic operation $B_0$", and the "measurement result" hatched are the "verification result from the CPU 14" in the first and second practical examples.

The arithmetic process performed by the DSP 13 includes an arithmetic operation A, an arithmetic operation B based on the result of the arithmetic operation A, and an arithmetic operation C based on the result of the arithmetic operation B. The result of the arithmetic operation C corresponds to the arithmetic result, which is the measurement result, in the first and second practical examples.

The DSP 13 performs the arithmetic operation A on each of a plurality of sensor data that are temporally continuous, and generates an arithmetic operation $A_0$, an arithmetic operation $A_1$, . . . , and an arithmetic operation $A_{M-1}$ (hereinafter referred to as a "result group of the arithmetic operation A", as occasion demands) respectively corresponding to the continuous sensor data. The DSP 13 repeats the arithmetic operation A, thereby to generate a plurality of result groups of the arithmetic operation A. The DSP 13 generates an arithmetic operation $B_0$, . . . , and an arithmetic operation $B_{N-1}$ (hereinafter referred to as a "result group of the arithmetic operation B", as occasion demands) by performing the arithmetic operation B, which is based on each of the plurality of result groups of the arithmetic operation A. The DSP 13 generates a measurement result (or an arithmetic result) by performing the arithmetic operation C, which is based on one result group of the arithmetic operation B.

If the sensor data on which the arithmetic operation A is performed includes the sensor data with the verification flag applied, the DSP 13 transmits the plurality of result groups of the arithmetic operation A and the result group of the arithmetic operation B, which are used to generate the measurement result associated with the verification flag applied, as well as the measurement result, to the CPU 14.

The verification processor of the CPU 14 performs the arithmetic operation A on the sensor data with the verification flag applied, which is outputted from the A/D unit 12, and generates, for example, an arithmetic operation $A_0$. The verification processor of the CPU 14 transmits the generated arithmetic operation $A_0$, and the arithmetic operation $A_0$ generated by performing the arithmetic operation A on the sensor data with the verification flag applied on the DSP 13, to the control apparatus 20 as one data (corresponding to "DSP/CPU VERIFICATION RESULT" in FIG. 8).

The verification processor of the CPU 14 generates, for example, an arithmetic operation $B_0$ by performing the arithmetic operation B, which is based on the arithmetic operation $A_0$ generated by the verification processor of the CPU 14 and which is also based on the arithmetic operation $A_1$, . . . , and the arithmetic operation $A_{M-1}$ of the result group of the arithmetic operation A including the arithmetic operation $A_0$ generated by performing the arithmetic operation A on the sensor data with the verification flag applied on the DSP 13, out of the plurality of result groups of the arithmetic operation A transmitted from the DSP 13. The verification processor of the CPU 14 transmits the generated arithmetic operation $B_0$ and the arithmetic operation $B_0$ generated by the DSP 13, to the control apparatus 20 as one data (corresponding to "DSP/CPU VERIFICATION RESULT" in FIG. 8).

The verification processor of the CPU 14 generates a measurement result by performing the arithmetic operation C, which is based on the arithmetic operation $B_0$ generated by the CPU 14 and which is also based on the arithmetic operation $B_1, \ldots,$ and an arithmetic operation $B_{N-1}$ generated by the DSP 13. The verification processor of the CPU 14 transmits the generated measurement result and the measurement result generated by the DSP 13, to the control apparatus 20 as one data (corresponding to "DSP/CPU VERIFICATION RESULT" in FIG. 8).

(Operations of Measurement System)

Next, operations of each of the DSP 13 and the CPU 14 will be explained with reference to flowcharts in FIG. 14 to FIG. 16.

Operations of DSP 13

Figure 14:
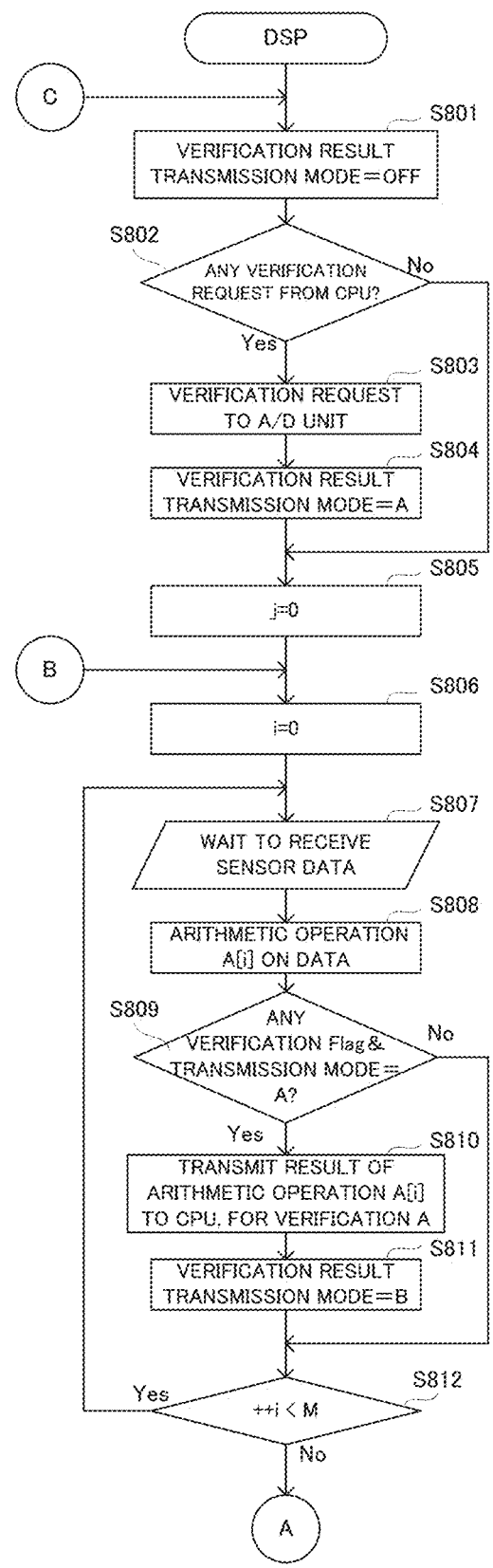
FIG. 14 is a flowchart illustrating a former half of a process performed by a DSP according to the third practical example.

In FIG. 14, the DSP 13 sets a verification result transmission mode to be "OFF" (step S801), and determines whether or not there is a verification request from the CPU 14 (i.e., whether or not a signal indicating a verification request is received) (step S802). In this determination, if it is determined that there is no verification request (the step S802: No), a step S805 described later is performed.

On the other hand, in the determination in the step S802, if it is determined that there is the verification request (the step S802: Yes), the DSP 13 transmits the signal indicating the verification request, to the A/D unit 12 (step S803), and sets the verification result transmission mode to be "A" (step S804).

The DSP 13 then sets an initial value "0" for a variable j (i.e., resets the variable j) (step S805), and sets an initial value "0" for a variable i (i.e., resets the variable i) (step S806). The DSP 13 is in a standby state until receiving the sensor data from the A/D unit 12 (step S807). When receiving the sensor data, the DSP 13 performs the arithmetic operation A on the sensor data, and generates, for example, an arithmetic operation $A_0$ (step S808).

The DSP 13 then determines whether or not the verification flag is applied to the sensor data used in the step S808, and whether or not the verification result transmission mode is "A" (step S809). In this determination, if it is determined that the verification flag is not applied, or that the verification result transmission mode is not "A" (the step S809: No), a step S812 described later is performed.

In the determination in the step S809, if it is determined that the verification flag is applied and that the verification result transmission mode is "A" (the step S809: Yes), the DSP 13 transmits the result of the arithmetic operation A generated in the step S808 to the CPU 14, for a verification A (step S810), and sets the verification result transmission mode to be "B" (step S811).

The DSP 13 then increments the variable i on condition that the variable i is less than a constant M (wherein M is a natural number) (step S812), and repeats the process from the step S807.

Figure 15:
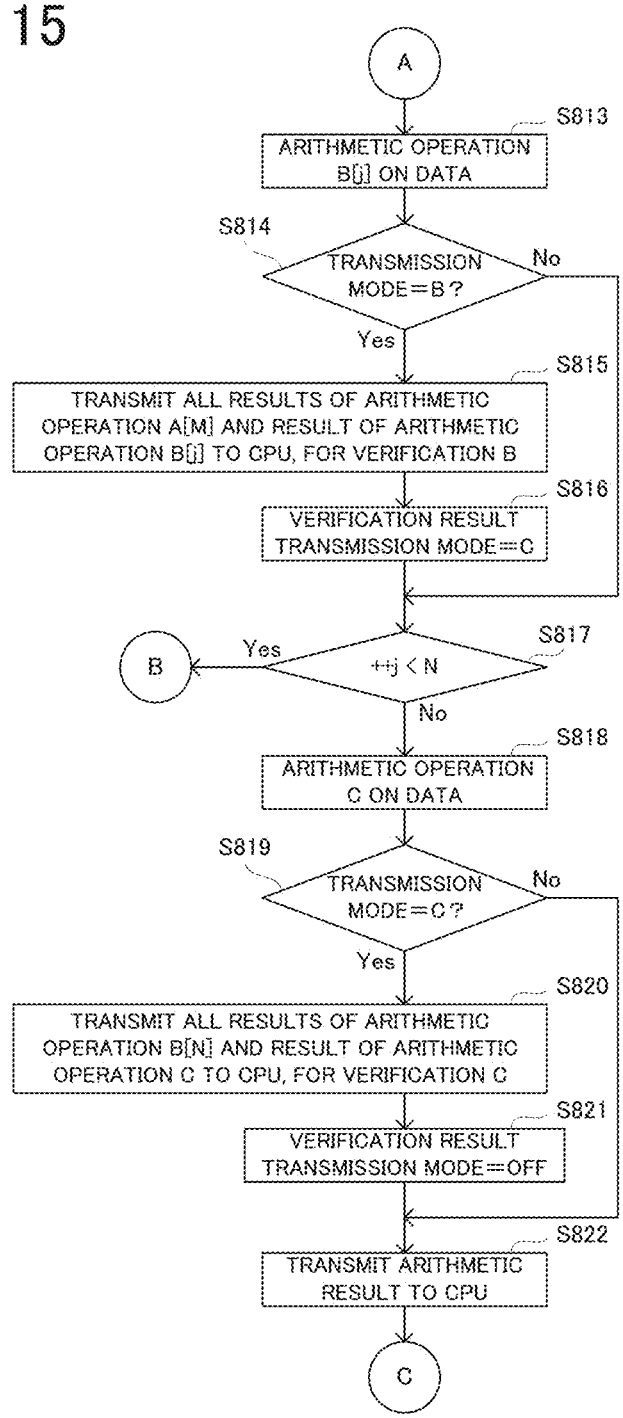
FIG. 15 is a flowchart illustrating a latter half of the process performed by the DSP according to the third practical example.

When the variable i becomes greater than or equal to the constant M (i.e., after a plurality of results of the arithmetic operation A are generated by repeating the steps S807 and S808), the DSP 13 generates, for example, an arithmetic operation $B_0$ by performing the arithmetic operation B, which is based on the plurality of results of the arithmetic operation A (e.g., an arithmetic operation $A_0$ to an arithmetic operation $A_{M-1}$) (step S813) (refer to FIG. 15).

The DSP 13 then determines whether or not the verification result transmission mode is "B" (step S814). In this determination, if it is determined that the verification result transmission mode is not "B" (the step S814: No), a step S817 described later is performed.

On the other hand, in the determination in the step S814, if it is determined that the verification result transmission mode is "B" (the step S814: Yes), the DSP 13 transmits the result of the arithmetic operation B generated in the step S813 and the plurality of results of the arithmetic operation A used for the arithmetic operation B, to the CPU 14, for a verification B (step S815), and sets the verification result transmission mode to be "C" (step S816).

The DSP 13 then increments the variable j on condition that the variable j is less than a constant N (wherein N is a natural number) (step S817), and repeats the process from the step S806.

When the variable j becomes greater than or equal to the constant N (i.e., after a plurality of results of the arithmetic operation B are generated by repeating the steps S806 to S813), the DSP 13 generates, for example, a measurement result by performing the arithmetic operation C, which is based on the plurality of results of the arithmetic operation B (e.g., an arithmetic operation $B_0$ to an arithmetic operation $B_{N-1}$) (step S818).

The DSP 13 then determines whether or not the verification result transmission mode is "C" (step S819). In this determination, if it is determined that the verification result transmission mode is not "C" (the step S819: No), a step S822 described later is performed.

On the other hand, in the determination in the step S819, if it is determined that the verification result transmission mode is "C" (the step S819: Yes), the DSP 13 transmits the result of the arithmetic operation C generated in the step S818 and the plurality of results of the arithmetic operation B used for the arithmetic operation C, to the CPU 14, for a verification C (step S820), and sets the verification result transmission mode to be "OFF" (step S821).

The DSP 13 then transmits the result of the arithmetic operation C generated in the step S818, to the CPU 14 as a measurement result (step S822).

Transmission Process of CPU 14

The transmission processor of the CPU 14 according to the third practical example performs the same process as that illustrated in FIG. 5. In other words, the transmission processor of the CPU 14 is in a standby state until receiving the arithmetic result from the DSP 13 (the step S301). When receiving the arithmetic result, the transmission processor of the CPU 14 transmits the arithmetic result to the control apparatus 20 as a measurement result (the step S302). Then, the process is repeated from the step S301.

Verification Process of CPU 14

Figure 16:
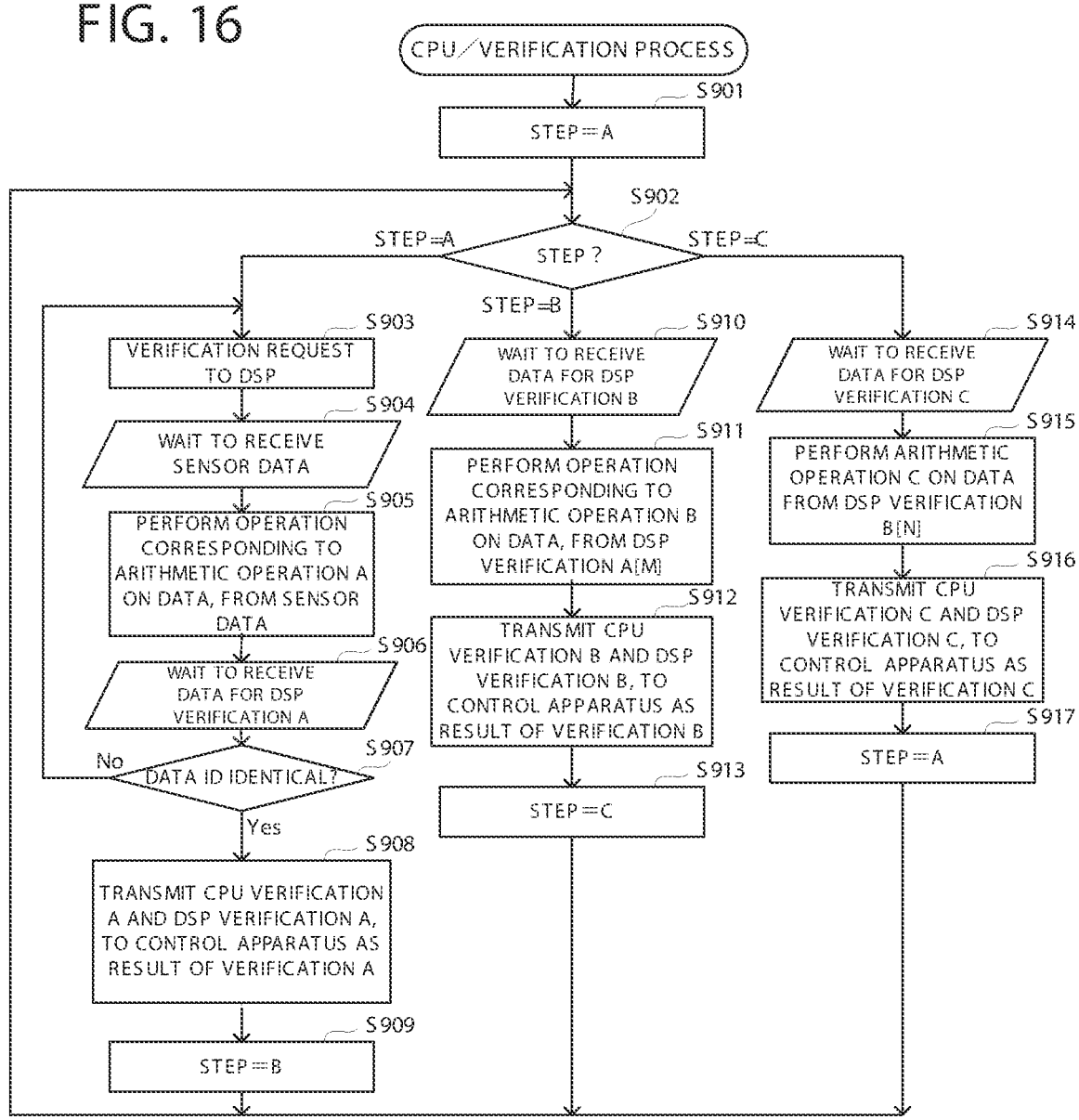
FIG. 16 is a flowchart illustrating a verification process performed by a CPU according to the third practical example.

In FIG. 16, the verification processor of the CPU 14 firstly sets a STEP, which is a parameter, to "A" (i.e., initializes STEP) (step S901). The verification processor of the CPU 14 then determines what the current STEP is (step S902). In this determination, if it is determined that the current STEP is "A", steps S903 to S909 are performed. If it is determined that the current STEP is "B", steps S910 to S913 are performed. If it is determined that the current STEP is "C", steps S914 to S917 are performed.

If the current STEP is "A", the verification processor of the CPU 14 transmits a signal indicating a verification request, to the DSP 13 (step S903). The verification processor of the CPU 14 then becomes in a standby state until receiving the sensor data with the verification flag applied, from the A/D unit 12 (step S904).

When receiving the sensor data with the verification flag applied, the verification processor of the CPU 14 performs the arithmetic operation A on the received sensor data and generates, for example, an arithmetic operation $A_0$ (step S905). The verification processor of the CPU 14 then becomes in a standby state until receiving data for the verification A, from the DSP 13 (step S906).

When receiving the data for the verification A, the verification processor of the CPU 14 determines whether or not the ID of the received data for the verification A and the ID of the sensor data with the verification flag applied are identical (step S907). In this determination, if it is determined that the IDs are not identical (the step S907: No), the step S903 is performed.

On the other hand, in the determination in the step S907, if it is determined that the IDs are identical (the step S907: Yes), the verification processor of the CPU 14 transmits the result of the arithmetic operation A in the step S905 (e.g., arithmetic operation $A_0$) and the data for the verification A, to the control apparatus 20 as one data (the result of the verification A) (step S908), and sets the STEP to "B" (step S909).

If the current STEP is "B", the verification processor of the CPU 14 becomes in a standby state until receiving data for the verification B from the DSP 13 (step S910). When receiving the data for the verification B, the verification processor of the CPU 14 performs the arithmetic operation B on the basis of the result of the arithmetic operation A in the step S905 and on the basis of the plurality of results of the arithmetic operation A performed by the DSP 13, which are included in the data for the verification B, and generates, for example, an arithmetic operation $B_0$ (step S911).

The verification processor of the CPU 14 then transmits the result of the arithmetic operation B in the step S911, and the result of the arithmetic operation B performed by the DSP 13, which is included in the data for the verification B, to the control apparatus 20 as one data (the result of the verification B) (step S912), and sets the STEP to "C" (step S913).

If the current STEP is "C", the verification processor of the CPU 14 becomes in a standby state until receiving data for the verification C from the DSP 13 (step S914). When receiving the data for the verification C, the verification processor of the CPU 14 performs the arithmetic operation C on the basis of the result of the arithmetic operation B in the step S911 and on the basis of the plurality of results of the arithmetic operation B performed by the DSP 13, which are included in the data for the verification C, and generates an arithmetic result (step S915).

The verification processor of the CPU 14 then transmits the result of the arithmetic operation C in the step S915, and the result of the arithmetic operation C performed by the DSP 13, which is included in the data for the verification C, to the control apparatus 20 as one data (the result of the verification C) (step S916), and sets the STEP to "A" (step S917).

The "arithmetic operation A", the "arithmetic operation B", the "arithmetic operation $A_0$, . . . , and the arithmetic operation $A_{M-1}$ generated by the DSP 13", the "arithmetic operation $B_0$, . . . , and the arithmetic operation $B_{N-1}$ generated by the DSP 13", the "arithmetic operation $A_0$ generated by the CPU 14", and the arithmetic operation $B_0$ generated by the CPU 14" according to the practical examples are respectively an example of the "first partial process of the second process", the "second partial process of the second process", the "first partial information", the "second partial information", the "third partial information", and the "fourth partial information" according to the present invention.

Fourth Practical Example

A measurement system according to a fourth practical example will be explained with reference to FIG. 17 to FIG. 20. The fourth practical example is the same as the aforementioned third practical example, except a part of the processes of the DSP 13 and the CPU 14 is different. Thus, in the fourth practical example, the same explanation as those in the first to third practical examples will be omitted, and the same reference numerals will carry in the same parts in the drawings. An explanation will be given only to basically different points with reference to FIG. 17 to FIG. 20.

Figure 17:
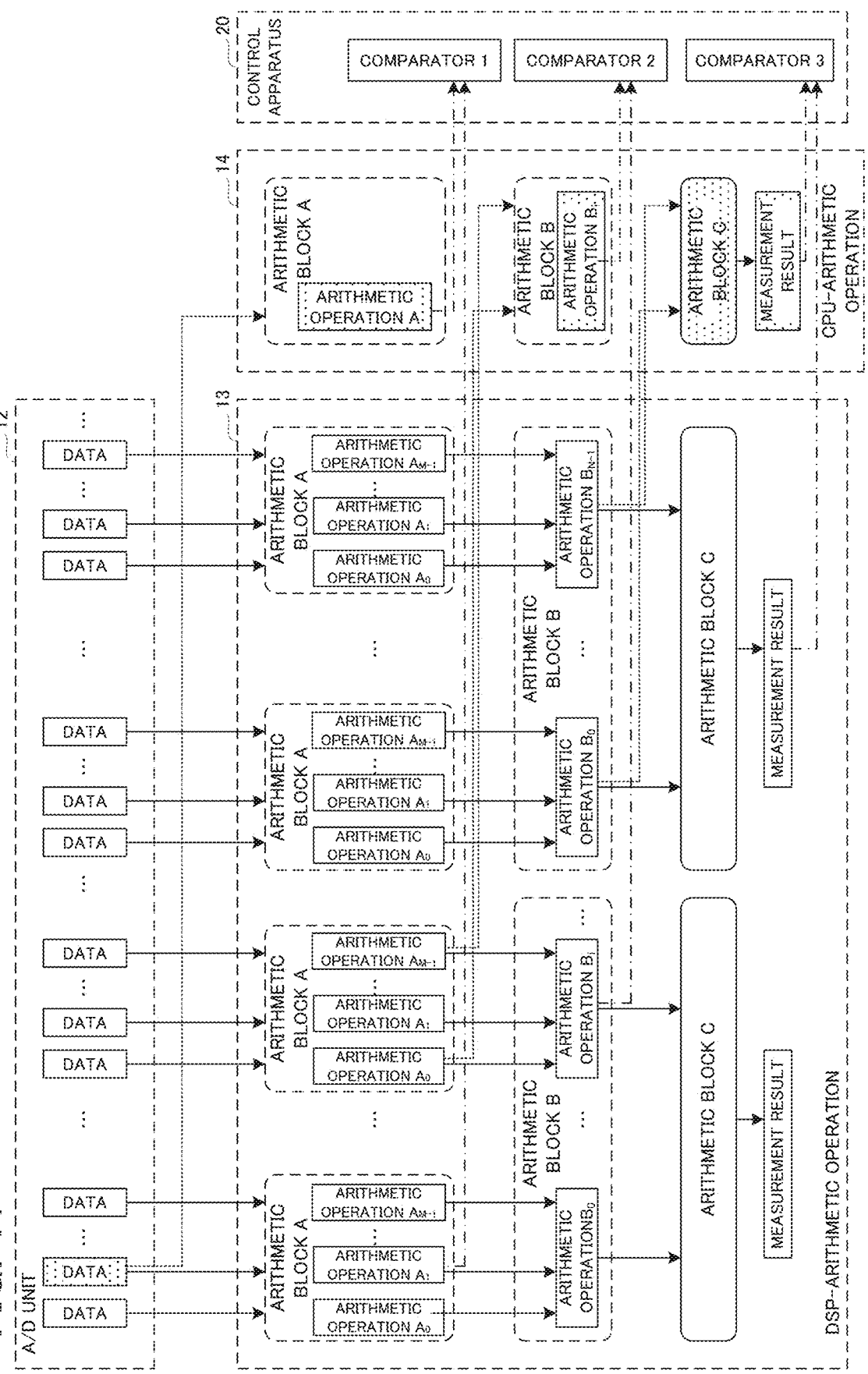
FIG. 17 is a conceptual diagram illustrating a flow of data according to a fourth practical example.

The data outputted from each of the DSP 13 and the CPU 14 will be explained with reference to FIG. 17. The "data" hatched in FIG. 17 is the sensor data with the verification data applied. Each of the "arithmetic operation A", an "arithmetic operation $B_1$", and the "measurement result" hatched are the "verification result from the CPU 14" in the first and second practical examples.

If the sensor data on which the arithmetic operation A is performed includes the sensor data with the verification flag applied, the DSP 13 transmits the result of the arithmetic operation A regarding the sensor data with the verification flag applied (e.g., an arithmetic operation $A_1$), to the CPU 14. The verification processor of the CPU 14 transmits the result of the arithmetic operation A performed on the sensor data with the verification flag applied, which is outputted from the A/D unit 12, and the result of the arithmetic operation A from the DSP 13, to the control apparatus 20 as one data.

The DSP 13 transmits the result of the arithmetic operation B (e.g., an arithmetic operation $B_i$), which is based on a plurality of results of the arithmetic operation A (e.g., an arithmetic operation $A_0$, . . . , and an arithmetic operation $A_{M-1}$) performed on a plurality of sensor data, and the plurality of results of the arithmetic operation A used for the arithmetic operation B, to the CPU 14. Here, the plurality of results of the arithmetic operation A transmitted to the CPU 14 may not include the result of the arithmetic operation A regarding the sensor data with the verification flag applied. The verification processor of the CPU 14 transmits the result of the arithmetic operation B performed by the CPU 14 based on the plurality of results of the arithmetic operation A from the DSP 13 (e.g., the arithmetic operation $B_i$), and the result of the arithmetic operation B from the DSP 13, to the control apparatus 20 as one data.

The DSP 13 transmits the result (or measurement result) of the arithmetic operation C performed on the basis of a plurality of results of the arithmetic operation B (e.g., an arithmetic operation $B_0$, . . . , and an arithmetic operation $B_{N-1}$), and the plurality of results of the arithmetic operation B used for the arithmetic operation C, to the CPU 14. The verification processor of the CPU 14 transmits the result of the arithmetic operation C performed by the CPU 14 based on the plurality of results of the arithmetic operation B from the DSP 13, and the result of the arithmetic operation C from the DSP 13, to the control apparatus 20 as one data.

(Operations of Measurement System)

Next, operations of each of the DSP 13 and the CPU 14 will be explained with reference to flowcharts in FIG. 18 to FIG. 20.

Operations of DSP 13

Figure 18:
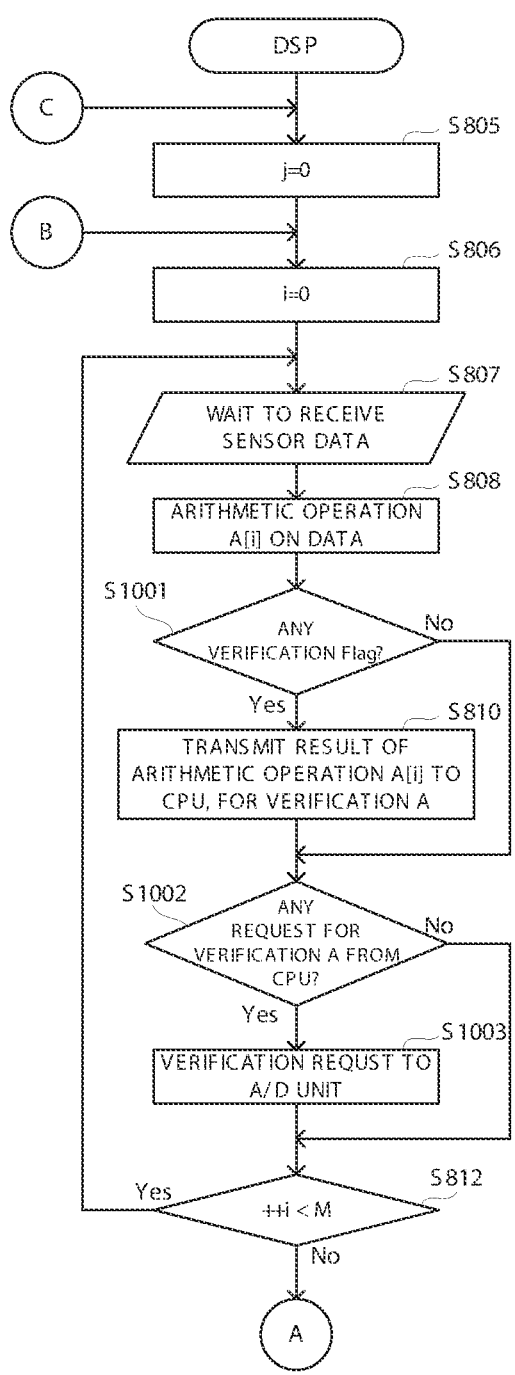
FIG. 18 is a flowchart illustrating a former half of a process performed by a DSP according to the fourth practical example.

In FIG. 18, after the step S808, the DSP 13 determines whether or not the verification flag is applied to the sensor data used in the step S808 (step S1001). In this determination, if it is determined that the verification flag is not applied (the step S1001: No), a step S1002 described later is performed. On the other hand, in this determination, if it is determined that the verification flag is applied (the step S1001: Yes), the DSP 13 performs the step S810.

The DSP 13 then determines whether or not there is a request for the verification A from the CPU 14 (i.e., whether or not a signal indicating a request for the verification A is received) (step S1002). In this determination, if it is determined that there is no request for the verification A (the step S1002: No), the step S812 is performed. On the other hand, in this determination, if it is determined that there is the request for the verification A (the step S1002: Yes), the DSP 13 transmits the signal indicating the request for the verification A, to the A/D unit 12 (step S1003).

Figure 19:
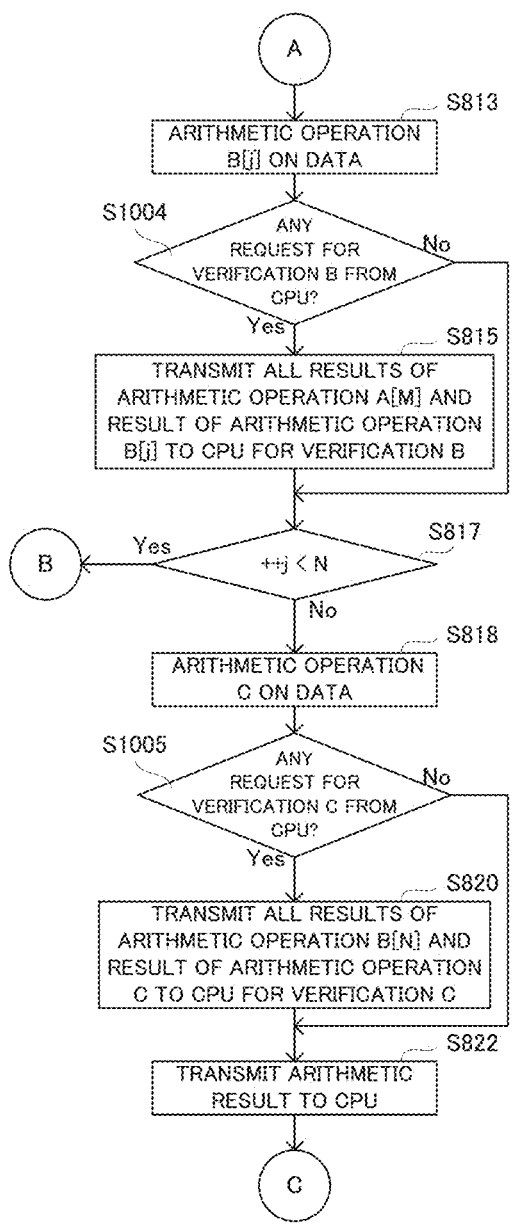
FIG. 19 is a flowchart illustrating a latter half of the process performed by the DSP according to the fourth practical example.

In FIG. 19, after the step S813, the DSP 13 determines whether or not there is a request for the verification B from the CPU 14 (i.e., whether or not a signal indicating a request for the verification B is received) (step S1004). In this determination, if it is determined that there is no request for the verification B (the step S1004: No), the step S817 is performed. On the other hand, in this determination, if it is determined that there is the request for the verification B (the step S1004: Yes), the DSP 13 performs the step S815.

After the step S818, the DSP 13 determines whether or not there is a request for the verification C from the CPU 14 (i.e., whether or not a signal indicating a request for the verification C is received) (step S1005). In this determination, if it is determined that there is no request for the verification C (the step S1005: No), the step S822 is performed. On the other hand, in this determination, if it is determined that there is the request for the verification C (the step S1005: Yes), the DSP 13 performs the step S820.

Transmission Process of CPU 14

The transmission processor of the CPU 14 according to the fourth practical example performs the same process as that illustrated in FIG. 5. In other words, the transmission processor of the CPU 14 is in a standby state until receiving the arithmetic result from the DSP 13 (the step S301). When receiving the arithmetic result, the transmission processor of the CPU 14 transmits the arithmetic result to the control apparatus 20 as a measurement result (the step S302). Then, the process is repeated from the step S301.

Verification Process of CPU 14

Figure 20:
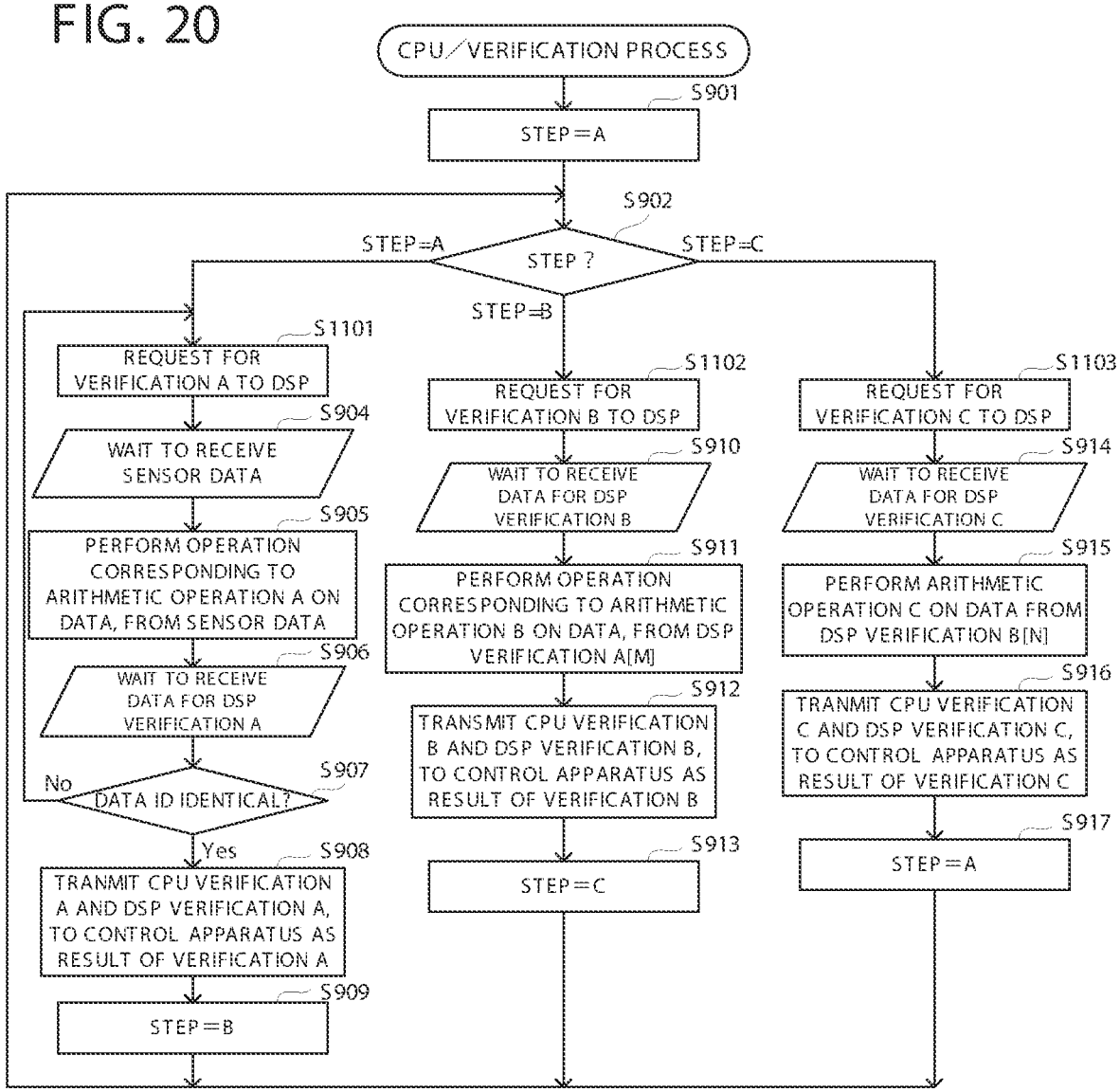
FIG. 20 is a flowchart illustrating a verification process performed by a CPU according to the fourth practical example.

In FIG. 20, if the current STEP is "A", the verification processor of the CPU 14 transmits a signal indicating the verification request A, to the DSP 13 (step S1101). The verification processor of the CPU 14 then performs the process from the step S904.

If the current STEP is "B", the verification processor of the CPU 14 transmits a signal indicating the verification request B, to the DSP 13 (step S1102). The verification processor of the CPU 14 then performs the process from the step S910.

If the current STEP is "C", the verification processor of the CPU 14 transmits a signal indicating the verification request C, to the DSP 13 (step S1103). The verification processor of the CPU 14 then performs the process from the step S914.

Fifth Practical Example

A measurement system according to a fifth practical example will be explained with reference to FIG. 21 to FIG. 24. The measurement system according to the fifth practical example is different from the aforementioned measurement system according to the first embodiment in that the sensor data is transmitted to the CPU 14 via the DSP 13. In the other configuration, the fifth practical example is substantially the same as the first practical example. Thus, in the fifth practical example, the same explanation as those in the first practical example will be omitted, and the same reference numerals will carry in the same parts in the drawings. An explanation will be given only to basically different points with reference to FIG. 21 to FIG. 24.

(Configuration of Measurement System)

Figure 21:
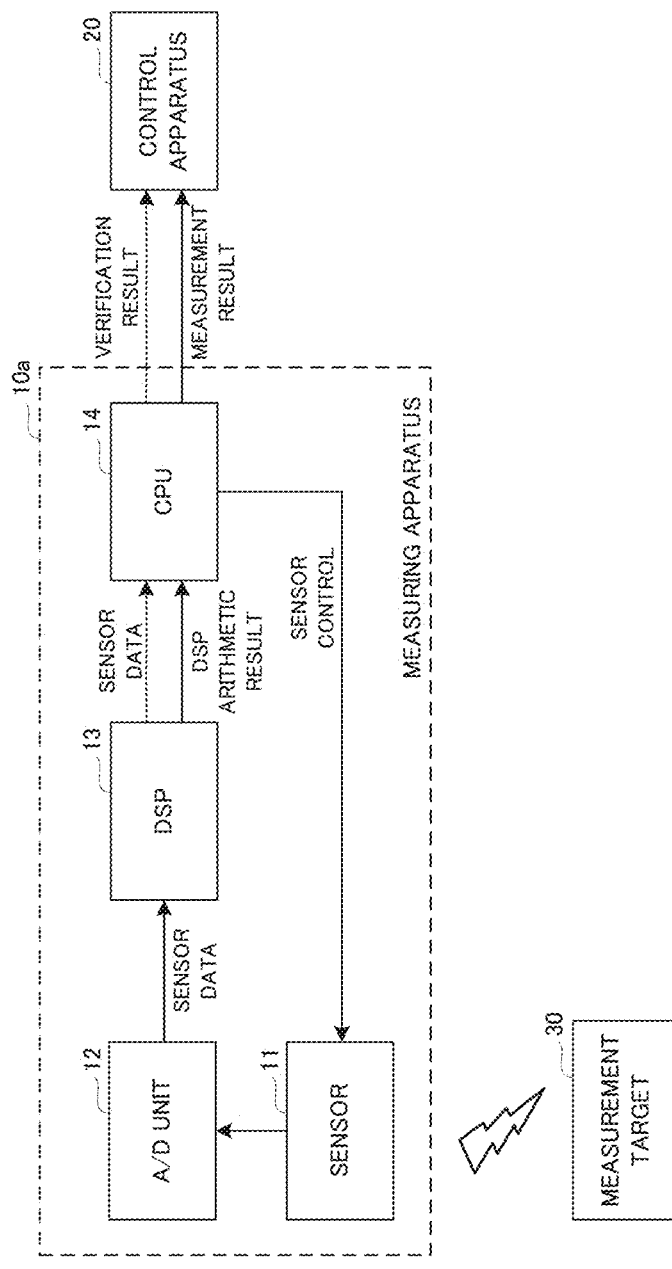
FIG. 21 is a block diagram illustrating a configuration of a measurement system according to a fifth practical example.

A configuration of the measurement system according to the fifth practical example will be explained with reference to FIG. 21. FIG. 21 is a block diagram illustrating the configuration of the measurement system according to the fifth practical example.

In FIG. 21, the measurement system is provided with a measuring apparatus 10a, which is another example of the information processing apparatus according to the present invention, and a control apparatus 20. The measuring apparatus 10a is provided with a sensor 11, an A/D unit 12, a DSP 13, and a CPU 14. Particularly in the fifth practical example, the CPU 14 is configured to obtain sensor data outputted from the A/D unit 12, via the DSP 13, and is configured to simulate a process of the DSP 13 by using the obtained sensor data (the details of which will be described later).

Next, the data outputted from each of the A/D unit 12, the DSP 13, and the CPU 14 will be explained with reference to FIG. 22.

Figure 22:
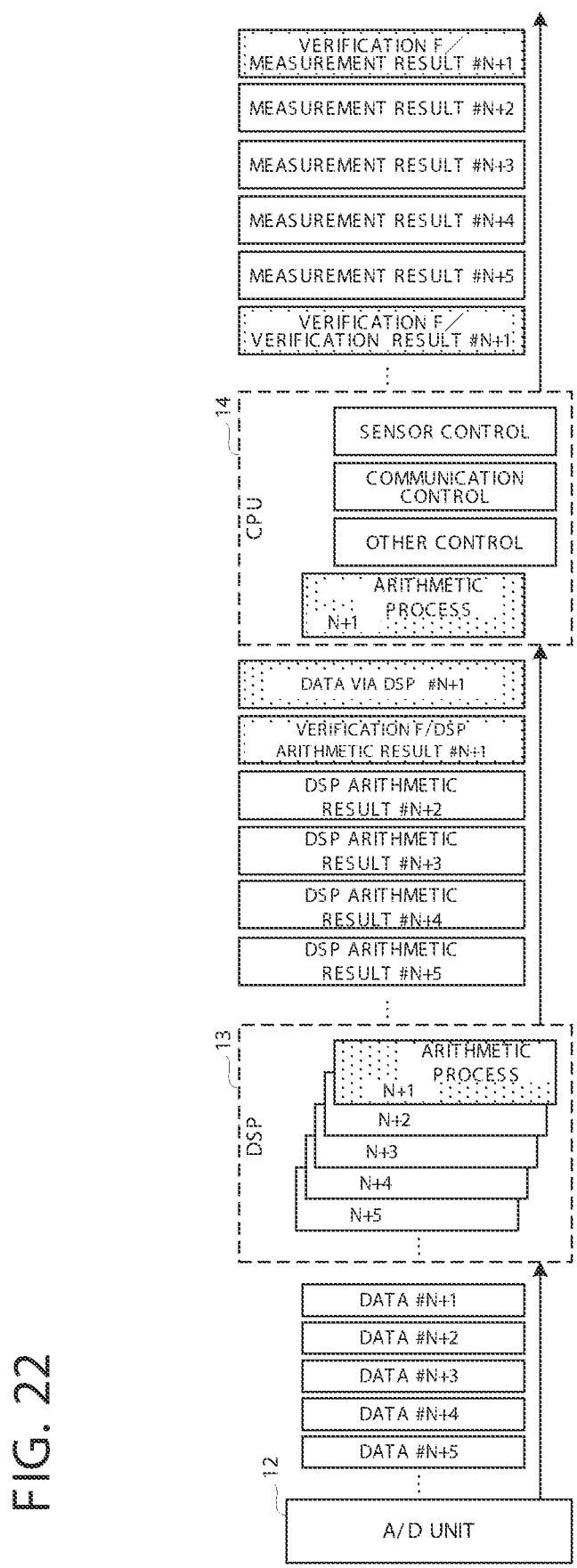
FIG. 22 is a conceptual diagram illustrating a flow of data according to the fifth practical example.

In FIG. 22, the A/D unit 12 performs the A/D conversion to analog data outputted from the sensor 11 and generates sensor data as digital data. The generated sensor data is successively outputted to the DSP 13.

The DSP 13 applies an ID to each sensor data outputted from the A/D unit 12. The DSP 13 performs a predetermined arithmetic process on the sensor data, and outputs an arithmetic result as data indicating a measurement result. Here, the arithmetic result has the same ID as that applied to the sensor data on the basis of which the arithmetic result is generated. The DSP 13 outputs the sensor data used in simulating the process of the DSP 13 on the CPU 14 ("DATA VIA DSP #N+1" in FIG. 22) to the CPU 14, and applies a verification flag to the arithmetic result generated by performing the predetermined arithmetic process on the sensor data ("VERIFICATION F/DSP ARITHMETIC RESULT #N+1" in FIG. 22).

The CPU 14 transmits the arithmetic result outputted from the DSP 13, to the control apparatus 20 as a measurement result. The CPU 14 further performs the same arithmetic process as the predetermined arithmetic process performed by the DSP 13 on the sensor data, on the sensor data obtained via the DSP 13, and applies the verification flag to resulting data, and transmits it to the control apparatus 20 as a verification result ("VERIFICATION F/VERIFICATION RESULT #N+1" in FIG. 22).

(Operations of Measurement System)

Next, operations of each of the A/D unit 12, the DSP 13, the CPU 14, and the control apparatus 20 will be explained with reference to flowcharts in FIG. 23 and FIG. 24.

Operations of A/D Unit 12

Figure 23:
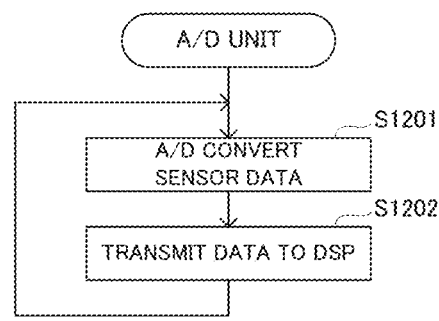

In FIG. 23, the A/D unit 12 performs the A/D conversion on the analog data outputted from the sensor 11 and generates the sensor data (step S1201). The A/D unit 12 then transmits the sensor data to the DSP 13 (step S1202). The process illustrated in FIG. 23 is repeated with a first predetermined period in operation of the measurement system.

Operations of DSP 13

Figure 24:
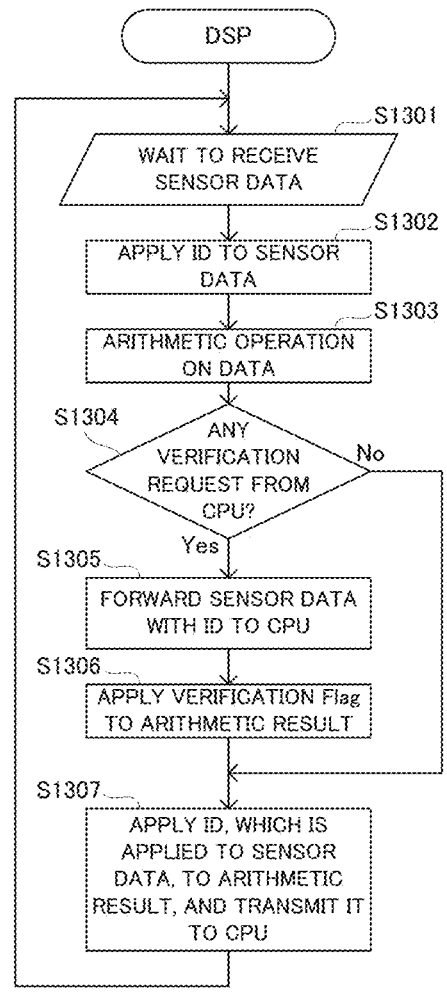

In FIG. 24, the DSP 13 is in a standby state until receiving the sensor data from the A/D unit 12 (step S1301). When receiving the sensor data, the DSP 13 applies an ID to the received sensor data (step S1302). The DSP 13 then performs a predetermined arithmetic process on the sensor data with the ID applied and generates an arithmetic result (step S1303).

The DSP 13 then determines whether or not there is a verification request from the CPU 14 (i.e., whether or not a signal indicating a verification request is received) (step S1304). In this determination, if it is determined that there is no verification request (step S1304: No), a step S1307 described later is performed.

On the other hand, in the determination in the step S1304, if it is determined that there is the verification request (step S1304: Yes), the DSP 13 transmits the sensor data with the ID applied in the step S1302, to the CPU 14 (step S1305), and applies a verification flag to the arithmetic result, which is generated by performing the predetermined arithmetic process on the sensor data transmitted to the CPU 14 (step S1306). In the fifth practical example, the DSP 13 transmits the sensor data to the CPU 14 when there is the verification request from the CPU 14. In other words, the DSP 13 typically transmits the sensor data that is a part of the sensor data received from the A/D unit 12, to the CPU 14.

The DSP 13 then applies the same ID as that applied to the sensor data on the basis of which the arithmetic result is generated, to the arithmetic result (including the arithmetic result with the verification flag applied), and transmits the arithmetic result with the ID applied, to the CPU 14 (step S1307). Then, the process is repeated from the step S1301.

Transmission Process of CPU 14

The transmission processor of the CPU 14 according to the fifth practical example performs the same process as that illustrated in FIG. 5. In other words, the transmission processor of the CPU 14 is in a standby state until receiving the arithmetic result from the DSP 13 (the step S301). When receiving the arithmetic result, the transmission processor of the CPU 14 transmits the arithmetic result to the control apparatus 20 as a measurement result (the step S302). Then, the process is repeated from the step S301.

Verification Process of CPU 14

The verification processor of the CPU 14 according to the fifth practical example performs the same process as that illustrated in FIG. 6. In other words, the verification processor of the CPU 14 transmits a signal indicating a verification request, to the DSP 13 (the step S311). The verification processor of the CPU 14 then becomes in a standby state until receiving the sensor data from the A/D unit 12 (the step S312).

When receiving the sensor data, the verification processor of the CPU 14 performs the same arithmetic process as the predetermined arithmetic process performed by the DSP 13 on the sensor data, on the received sensor data, and generates a verification result (the step S313). The verification processor of the CPU 14 then applies the verification flag to the generated verification result and transmits it to the control apparatus 20 (the step S314). Then, the process is repeated from the step S311.

Operations of Control Apparatus

The control apparatus 20 according to the fifth practical example performs the same process as that illustrated in FIG. 7. In other words, the control apparatus 20 is in a standby state until receiving the measurement result or the verification result from the CPU 14 (the step S401). When receiving the measurement result or the verification result, the control apparatus 20 determines a type of the received data (the step S402). In this determination, if it is determined that it is the measurement result, the control apparatus 20 determines whether or not the verification flag is applied to the received measurement result (the step S403). In this determination, if it is determined that the verification flag is not applied (the step S403: No), the step S405 described later is performed.

On the other hand, in the determination in the step S403, if it is determined that the verification flag is applied (the step S403: Yes), the control apparatus 20 temporarily stores the measurement result with the verification flag applied, for example, in a memory (not illustrated) or the like, as verification comparative data (the step S404).

The control apparatus 20 then controls the measurement system on the basis of the measurement result (the step S405). Then, the process returns to the step S401.

In the determination in the step S402, if it is determined that it is the verification result, the control apparatus 20 determines whether or not the verification comparative data is stored (the step S406). In this determination, if it is determined that the verification comparative data is not stored (the step S406: No), the process returns to the step S401.

On the other hand, in the determination in the step S406, if it is determined that the verification comparative data is stored (the step S406: Yes), the control apparatus 20 determines whether or not the ID of the verification comparative data and the ID of the received verification result are identical (the step S407). In this determination, if it is determined that the IDs are not identical (the step S407; No), the process returns to the step S401.

On the other hand, in the determination in the step S407, if it is determined that the IDs are identical (the step S407; Yes), the control apparatus 20 determines whether or not the measurement result with the verification flag applied, which is the verification comparative data, and the received verification result mismatch (the step S408). In this determination, if it is determined that they do not mismatch (i.e., if the measurement result with the verification flag applied matches the verification result) (the step S408: No), the measurement system is normal, and thus the process returns to the step S401.

On the other hand, in the determination in the step S408, if it is determined that they mismatch (the step S408: Yes), the control apparatus 20 performs a failure determination process (the step S409).

Sixth Practical Example

A measurement system according to a sixth practical example will be explained with reference to FIG. 25 to FIG. 27. The measurement system according to the sixth practical example is the same as that in the aforementioned fifth practical example, except a part of the processes of the DSP 13 and the CPU 14 is different. Thus, in the sixth practical example, the same explanation as those in the fifth practical example will be omitted, and the same reference numerals will carry in the same parts in the drawings. An explanation will be given only to basically different points with reference to FIG. 25 to FIG. 27.

The data outputted from each of the DSP 13 and the CPU 14 will be explained with reference to FIG. 25.

The DSP 13 performs the predetermined arithmetic process on the sensor data and outputs the arithmetic result. Here, regarding the sensor data transmitted to the CPU 14, the DSP 13 outputs the arithmetic result of a part of the arithmetic process (e.g., a former half) (i.e., an arithmetic result indicating an interim progress: "PART OF CALCULATION" in FIG. 25) (refer to "DSP VERIFICATION RESULT #N+1" in FIG. 25).

Particularly in the sixth practical example, the DSP 13 divides the sensor data transmitted to the CPU 14, into M data, and successively transmits the divided sensor data to the CPU 14 ("DATA #N+1 (M/M)", "DATA #N+1 (M−1/

Figure 25:
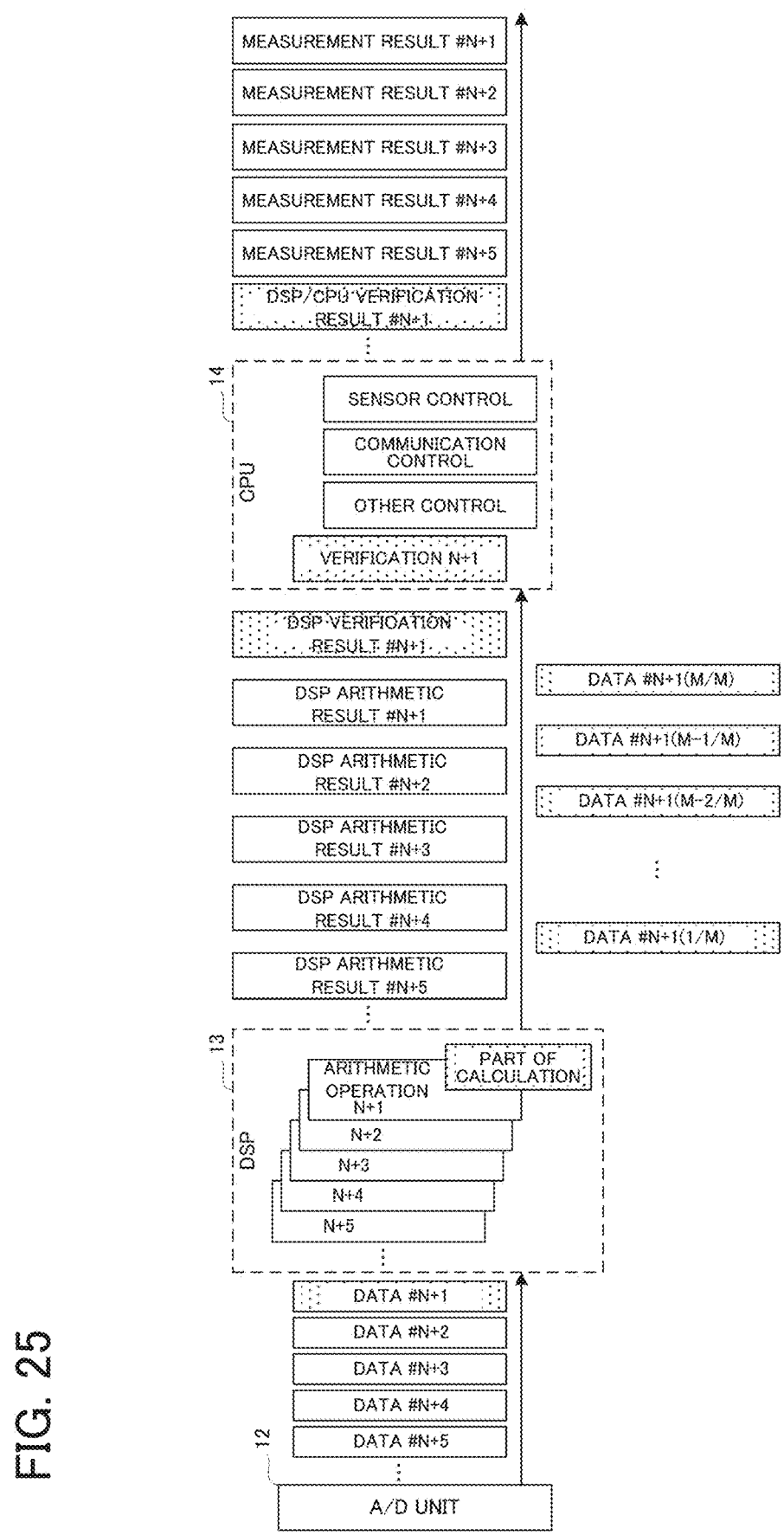

M)", and so on in FIG. 25). The divided sensor data according to the sixth practical example is an example of the "sixth partial information" according to the present invention.

The CPU 14 obtains the sensor data outputted from the A/D unit 12, via the DSP 13, and performs the same arithmetic process as the part of the arithmetic process performed by the DSP 13 on the sensor data, by using the obtained sensor data, and transmits resulting data and a verification result outputted from the DSP 13, to the control apparatus 20 as one data ("DSP/CPU VERIFICATION RESULT #N+1" in FIG. 25).

(Operations of Measurement System)

Next, operations of each of the DSP 13, the CPU 14, and the control apparatus 20 will be explained with reference to flowcharts in FIG. 26 and FIG. 27.

Operations of DSP 13

Figure 26:
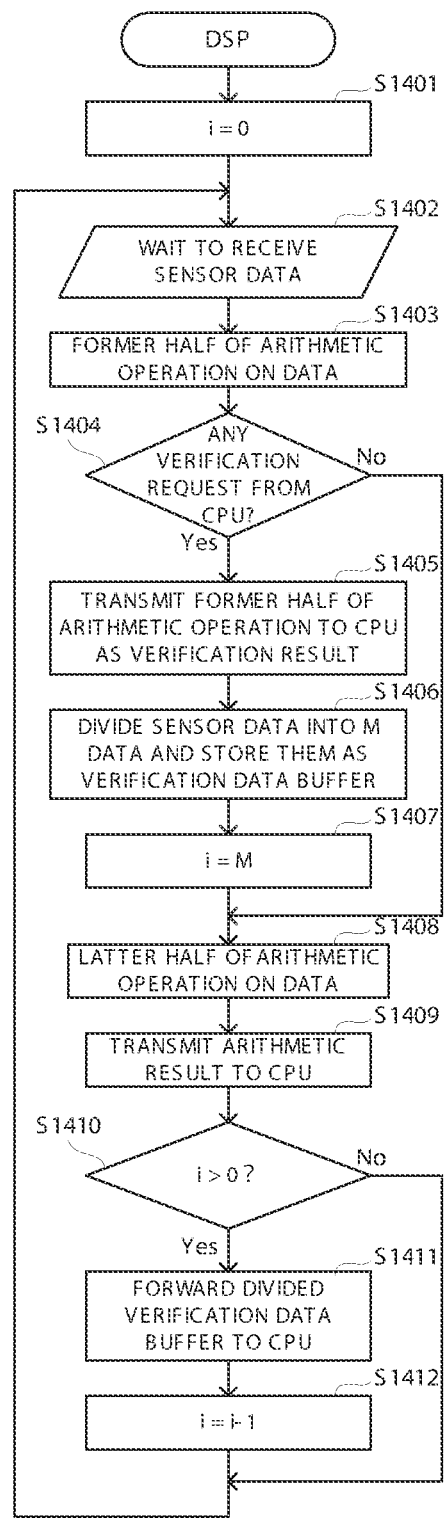

In FIG. 26, the DSP 13 firstly sets an initial value "0" for the variable i (i.e., resets the variable i) (step S1401). The DSP 13 is in a standby state until receiving the sensor data from the A/D unit 12 (step S1402).

When receiving the sensor data, the DSP 13 performs a former half of the predetermined arithmetic process on the received sensor data and generates a partial arithmetic result, which is the result of the former half (step S1403).

The DSP 13 then determines whether or not there is a verification request from the CPU (i.e., whether or not a signal indicating a verification request is received (step S1404). In this determination, if it is determined that there is no verification request (the step S1404: No), a step S1408 described later is performed.

On the other hand, in the determination in the step S1404, if it is determined that there is the verification request (the step S1404: Yes), the DSP 13 transmits the partial arithmetic result generated in the step S1403, to the CPU 14 as a verification result (step S1405). The DSP 13 then divides the sensor data used to generate the partial arithmetic result, which is the verification result, into M data and stores them as a verification data buffer (step S1406), and sets "M" for the variable i (step S1407).

The DSP 13 then performs a latter half of the predetermined arithmetic process on the received sensor data and generates an arithmetic result (step S1408). The DSP 13 then transmits the arithmetic result to the CPU 14.

The DSP 13 then determines whether or not the variable i is greater than 0 (step S1410). In this determination, if it is determined that the variable i is less than or equal to 0 (the step S1410: No), the process is repeated from the step S1402.

On the other hand, if it is determined that the variable i is greater than 0 (the step S1410: Yes), the DSP 13 transmits data corresponding to a value of the variable i out of the verification data buffer, to the CPU 14 (step S1411), and decrements the variable i (step S1412). Then, the process is repeated from the step S1402.

Transmission Process of CPU 14

The transmission processor of the CPU 14 according to the sixth practical example performs the same process as that illustrated in FIG. 10. In other words, the transmission processor of the CPU 14 is in a standby state until receiving the arithmetic result or the verification result from the DSP 13 (the step S601). When receiving the data, the transmission processor of the CPU 14 determines a type of the received data (the step S602). In this determination, if it is determined that it is the arithmetic result, the transmission processor of the CPU 14 transmits the arithmetic result to the control apparatus 20 as a measurement result (the step S302). Then, the process is repeated from the step S601.

On the other hand, in the determination in the step S602, if it is determined that it is the verification result, the transmission processor of the CPU 14 temporarily stores the verification result, for example, in a memory or the like, as a DSP verification result (the step S603). Then, the process is repeated from the step S601.

Verification Process of CPU 14

Figure 27:
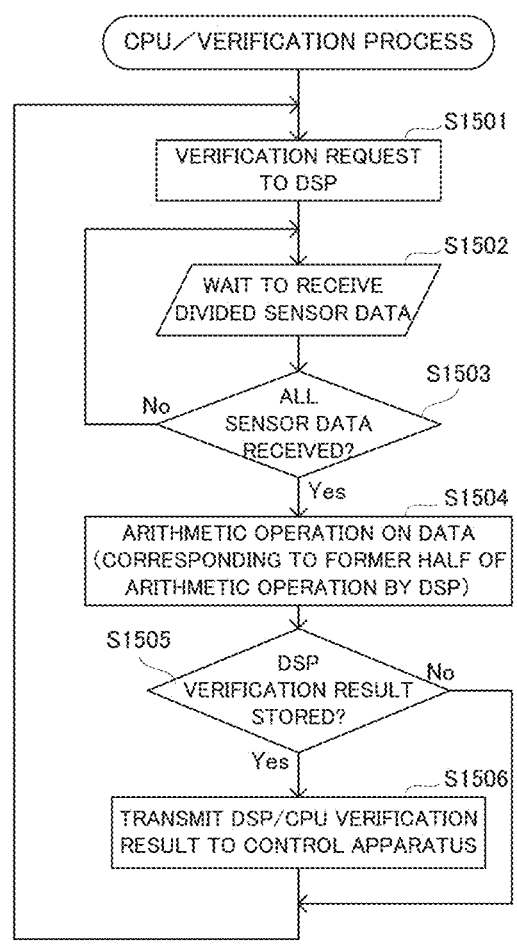

In FIG. 27, the verification processor of the CPU 14 transmits a signal indicating a verification request, to the DSP 13 (step S1501). The verification processor of the CPU 14 then becomes in a standby state until receiving the sensor data from the A/D unit 12 (step S1502).

When receiving the sensor data, the verification processor of the CPU 14 determines whether or not all the divided sensor data is received (step S1503). In this determination, if it is determined that all the divided sensor data is not received (the step S1503: No), the process is repeated from the step S1502.

On the other hand, in the determination in the step S1503, if it is determined that all the divided sensor data is received (the step S1503: Yes), the CPU 14 performs the same arithmetic process as the former half of the predetermined arithmetic process, which is performed by the DSP 13 on the sensor data, on the received sensor data and generates a CPU verification result (step S1504).

The verification processor of the CPU 14 determines whether or not the DSP verification result is stored (step S1505). In this determination, if it is determined that the DSP verification result is not stored (the step S1505: No), the step S1501 is performed.

On the other hand, in the determination in the step S1505, if it is determined that the DSP verification result is stored (the step S1505: Yes), the step S1501 is performed, the verification processor of the CPU 14 transmits the DSP verification result and the CPU verification result, to the control apparatus 20 as one data (step S1506). Then, the step S1501 is performed.

Operations of Control Apparatus

The control apparatus 20 according to the sixth practical example performs the same process as that illustrated in FIG. 12. In other words, in FIG. 12, in the determination in the step S402, if it is determined that it is the measurement result, the control apparatus 20 controls the measurement system on the basis of the measurement result (the step S405). Then, the process returns to the step S401.

On the other hand, in the determination in the step S402, if it is determined that it is the verification result, the control apparatus 20 determines whether or not the DSP verification result and the CPU verification result mismatch (the step S701). In this determination, if it is determined that they do not mismatch (i.e., if the DSP verification result matches the CPU verification result) (the step S701: No), the measurement system is normal, and thus the process returns to the step S401.

On the other hand, in the determination in the step S701, if it is determined that they mismatch (the step S701: Yes), the control apparatus 20 performs the failure determination process (the step S409).

Seventh Practical Example

Figure 28:
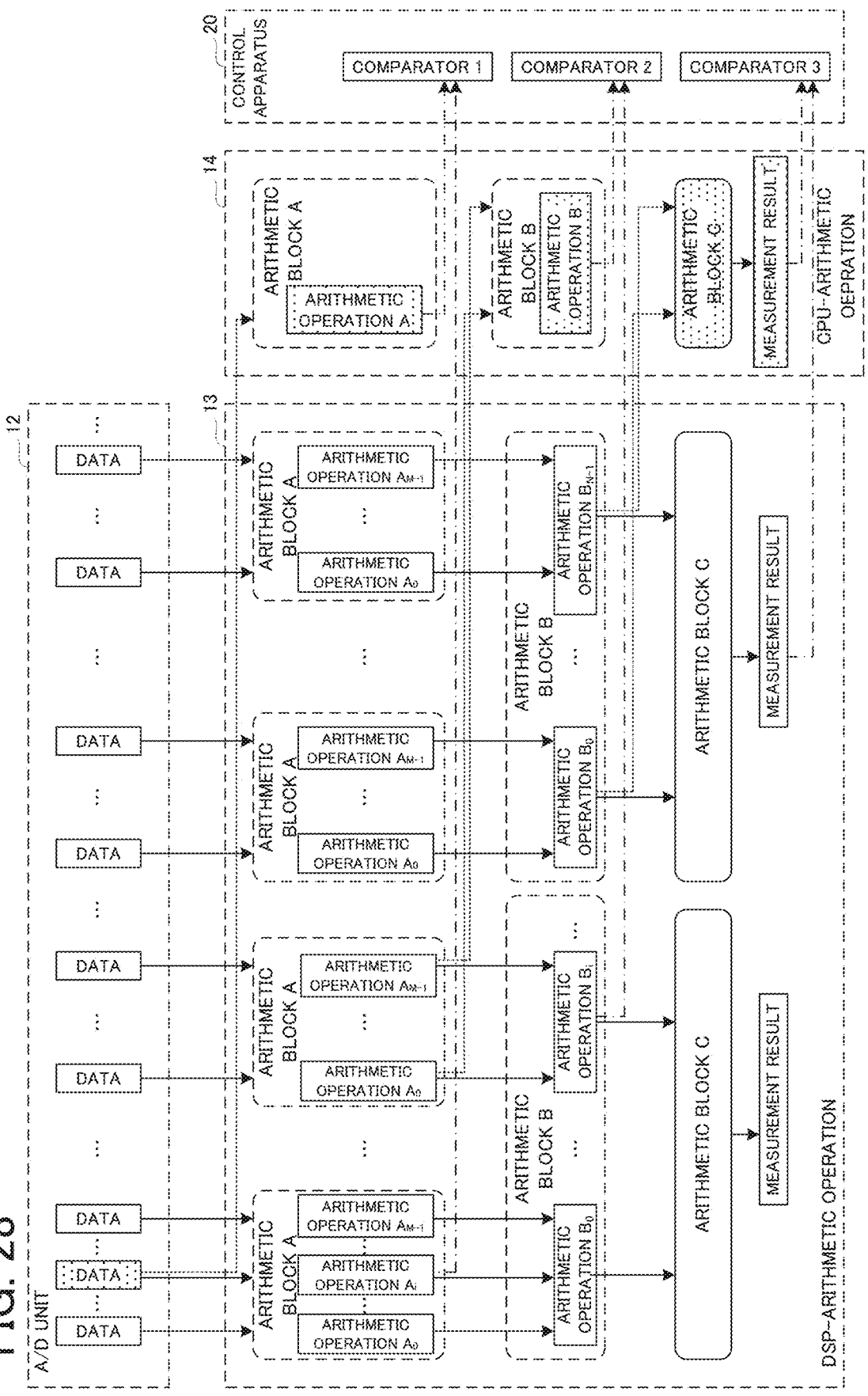

A measurement system according to a seventh practical example will be explained with reference to FIG. 28 to FIG. 30. The seventh practical example is the same as the aforementioned fifth practical example, except a part of the processes of the DSP 13 and the CPU 14 is different. Thus, in the seventh practical example, the same explanation as those in the fifth practical example will be omitted, and the same reference numerals will carry in the same parts in the drawings. An explanation will be given only to basically different points with reference to FIG. 28 to FIG. 30.

The data outputted from each of the DSP 13 and the CPU 14 will be explained with reference to FIG. 28. The "arithmetic operation A" hatched in FIG. 28 is obtained by applying the verification flag to the result of the arithmetic operation A, which is performed on the sensor data transmitted to the CPU 14 via the DSP 13 ("DATA" hatched in FIG. 28). Each of the "arithmetic operation A", the "arithmetic operation B", and the "measurement result" hatched are the "verification result from the CPU 14" in the fifth practical example.

The DSP 13 applies the verification flag to the result of the arithmetic operation A regarding the sensor data transmitted to the CPU 14 (e.g., an arithmetic operation $A_i$) out of the received sensor data, and transmits it to the CPU 14. The verification process of the CPU 14 transmits the result of the arithmetic operation A, which is performed on the sensor data obtained via the DSP 13, and the result of the arithmetic operation A from the DSP 13, to the control apparatus 20 as one data.

The DSP 13 transmits the result of the arithmetic operation B (e.g., an arithmetic operation $B_i$), which is based on a plurality of results of the arithmetic operation A (e.g., an arithmetic operation $A_0$, . . . , and an arithmetic operation $A_{M-1}$) performed on a plurality of sensor data, and the plurality of results of the arithmetic operation A used for the arithmetic operation B, to the CPU 14. The verification processor of the CPU 14 transmits the result of the arithmetic operation B performed by the CPU 14 based on the plurality of results of the arithmetic operation A from the DSP 13 (e.g., the arithmetic operation $B_i$), and the result of the arithmetic operation B from the DSP 13, to the control apparatus 20 as one data.

The DSP 13 transmits the result (or measurement result) of the arithmetic operation C performed on the basis of a plurality of results of the arithmetic operation B (e.g., an arithmetic operation $B_0$, . . . , and an arithmetic operation $B_{N-1}$), and the plurality of results of the arithmetic operation B used for the arithmetic operation C, to the CPU 14. The verification processor of the CPU 14 transmits the result of the arithmetic operation C performed by the CPU 14 based on the plurality of results of the arithmetic operation B from the DSP 13, and the result of the arithmetic operation C from the DSP 13, to the control apparatus 20 as one data.

(Operations of Measurement System)

Next, operations of each of the DSP 13 and the CPU 14 will be explained with reference to flowcharts in FIG. 29 and FIG. 30.

Operations of DSP 13

Figure 29:
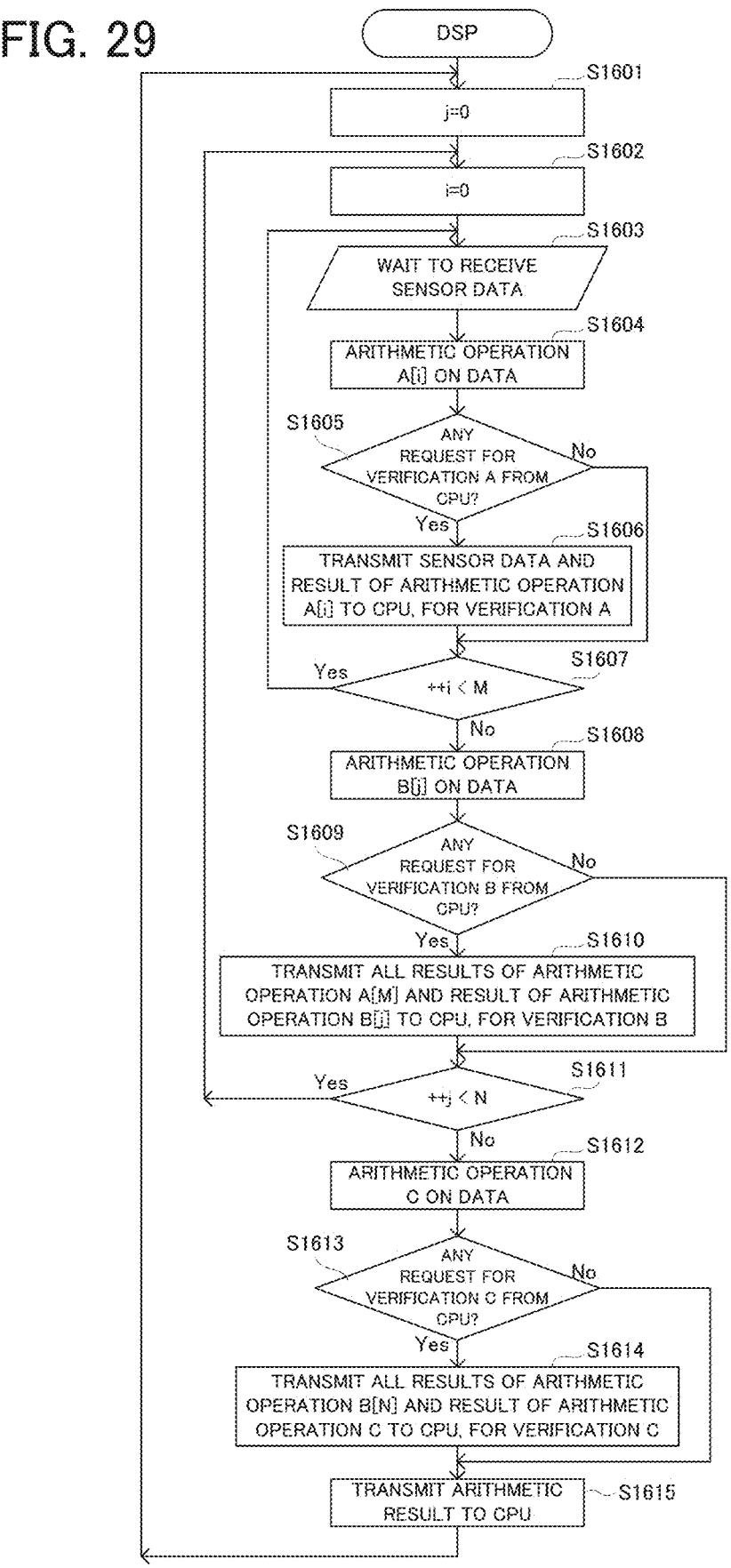

In FIG. 29, the DSP 13 firstly sets an initial value "0" for the variable j (i.e., resets the variable j) (step S1601), and sets an initial value "0" for the variable i (i.e., resets the variable i) (step S1602). The DSP 13 is in a standby state until receiving the sensor data from the A/D unit 12 (step S1603). When receiving the sensor data, the DSP 13 performs the arithmetic operation A on the sensor data, and generates, for example, an arithmetic operation $A_1$ (step S1604).

The DSP 13 then determines whether or not there is a request for the verification A from the CPU 14 (i.e., whether or not a signal indicating a request for the verification A is received) (step S1605). In this determination, if it is determined that there is no request for the verification A (the step S1605: No), a step S1607 described later is performed. On the other hand, in this determination, if it is determined that there is the request for the verification A (the step S1605: Yes), the DSP 13 transmits the result of the arithmetic operation A generated in the step S1604, and the sensor data used for the arithmetic operation A, to the CUP 14 for the verification A (step S1606).

The DSP 13 then increments the variable i on condition that the variable i is less than a constant M (wherein M is a natural number) (step S1607), and repeats the process from the step S1603.

When the variable i becomes greater than or equal to the constant M (i.e., after a plurality of results of the arithmetic operation A are generated by repeating the steps S1603 and S1604), the DSP 13 generates, for example, an arithmetic operation $B_i$ by performing the arithmetic operation B, which is based on the plurality of results of the arithmetic operation A (e.g., an arithmetic operation $A_0$ to an arithmetic operation $A_{M-1}$) (step S1608).

The DSP 13 then determines whether or not there is a request for the verification B from the CPU 14 (i.e., whether or not a signal indicating a request for the verification B is received) (step S1609). In this determination, if it is determined that there is no request for the verification B (the step S1609: No), a step S1611 described later is performed. On the other hand, in this determination, if it is determined that there is the request for the verification B (the step S1609: Yes), the DSP 13 transmits the result of the arithmetic operation B generated in the step S1608, and the plurality of results of the arithmetic operation A used for the arithmetic operation B, to the CUP 14 for the verification B (step S1610).

The DSP 13 then increments the variable j on condition that the variable j is less than a constant N (wherein N is a natural number) (step S1611), and repeats the process from the step S1602.

When the variable j becomes greater than or equal to the constant N (i.e., after a plurality of results of the arithmetic operation B are generated by repeating the steps S1602 to S1608), the DSP 13 generates a measurement result by performing the arithmetic operation C, which is based on the plurality of results of the arithmetic operation B (e.g., an arithmetic operation $B_0$ to an arithmetic operation $B_{N-1}$) (step S1612).

The DSP 13 then determines whether or not there is a request for the verification C from the CPU 14 (i.e., whether or not a signal indicating a request for the verification C is received) (step S1613). In this determination, if it is determined that there is no request for the verification C (the step S1613: No), a step S1615 described later is performed. On the other hand, in this determination, if it is determined that there is the request for the verification C (the step S1613: Yes), the DSP 13 transmits the result of the arithmetic operation C generated in the step S1612, and the plurality of results of the arithmetic operation B used for the arithmetic operation C, to the CUP 14 for the verification C (step S1614).

The DSP 13 then transmits the result of the arithmetic operation C generated in the step S1612 to the CPU 14 as a measurement result (step S1615).

Transmission Process of CPU 14

The transmission processor of the CPU 14 according to the seventh practical example performs the same process as that illustrated in FIG. 5. In other words, the transmission processor of the CPU 14 is in a standby state until receiving the arithmetic result from the DSP 13 (the step S301). When receiving the arithmetic result, the transmission processor of the CPU 14 transmits the arithmetic result to the control apparatus 20 as a measurement result (the step S302). Then, the process is repeated from the step S301.

Verification Process of CPU 14

Figure 30:
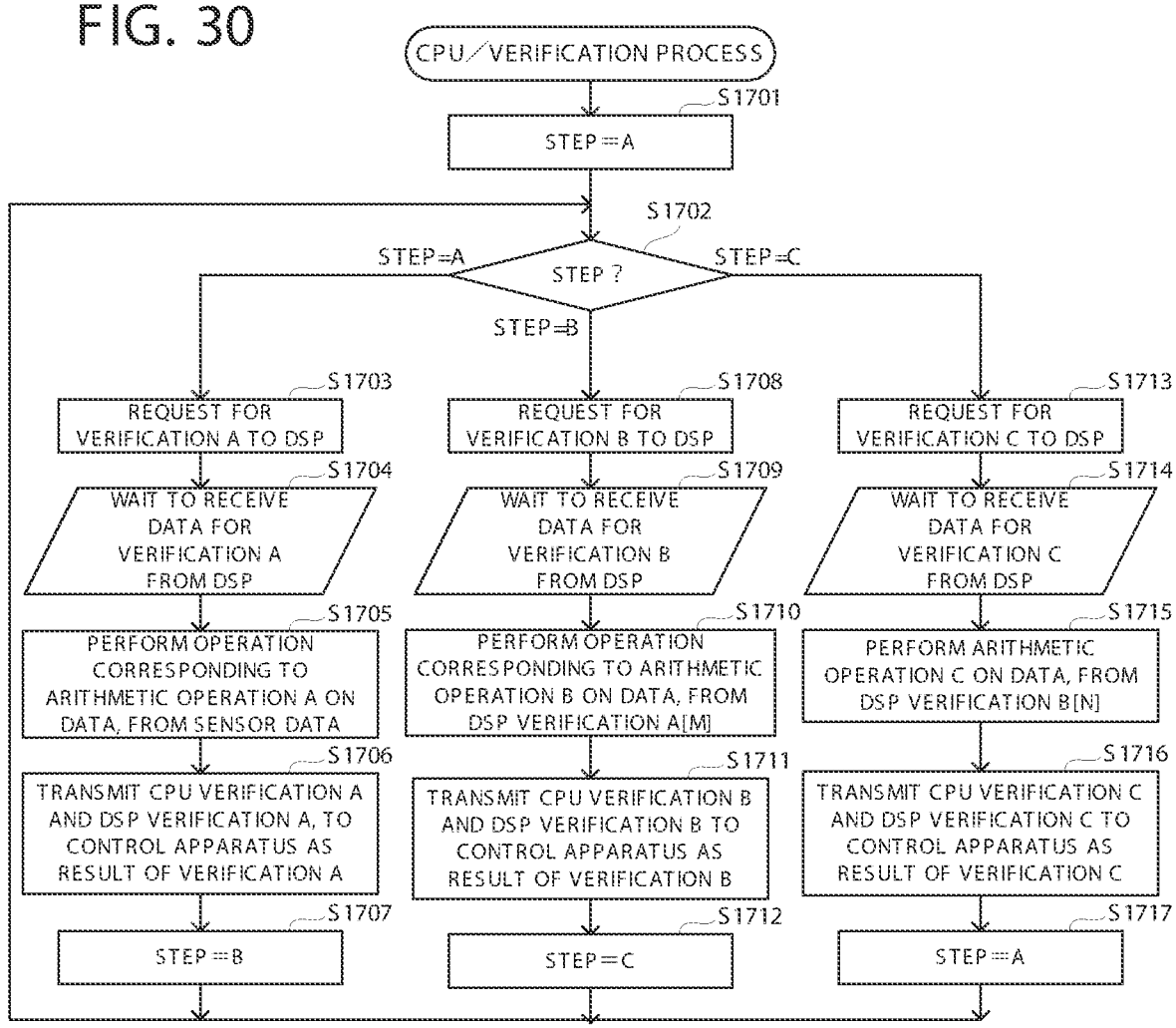

In FIG. 30, the verification processor of the CPU 14 firstly sets a STEP, which is a parameter, to "A" (i.e., initializes STEP) (step S1701). The verification processor of the CPU 14 then determines what the current STEP is (step S1702). In this determination, if it is determined that the current STEP is "A", steps S1703 to S1707 are performed. If it is determined that the current STEP is "B", steps S1708 to S1712 are performed. If it is determined that the current STEP is "C", steps S1713 to S1717 are performed.

If the current STEP is "A", the verification processor of the CPU 14 transmits a signal indicating a request for the verification A, to the DSP 13 (step S1703). The verification processor of the CPU 14 then becomes in a standby state until receiving data for the verification A, from the DSP 13 (step S1704).

When receiving the data for the verification A, the verification processor of the CPU 14 performs the arithmetic operation A on the sensor data included in the received data for the verification A, and generates, for example, an arithmetic operation $A_1$ (step S1705).

The verification processor of the CPU 14 then transmits the result of the arithmetic operation A in the step S1705, and the result of the arithmetic operation A performed by the DSP 13, which is included in the data for the verification A, to the control apparatus 20 as one data (step S1706), and sets the STEP to "B" (step S1707).

If the current STEP is "B", the verification processor of the CPU 14 transmits a signal indicating a request for the verification B, to the DSP 13 (step S1708). The verification processor of the CPU 14 then becomes in a standby state until receiving data for the verification B, from the DSP 13 (step S1709). When receiving the data for the verification B, the verification processor of the CPU 14 performs the arithmetic operation B on the basis of the plurality of results of the arithmetic operation A performed by the DSP 13, which are included in the received data for the verification B, and generates, for example, an arithmetic operation $B_j$ (step S1710).

The verification processor of the CPU 14 then transmits the result of the arithmetic operation B in the step S1710, and the result of the arithmetic operation B performed by the DSP 13, which is included in the data for the verification B, to the control apparatus 20 as one data (step S1711), and sets the STEP to "C" (step S1712).

If the current STEP is "C", the verification processor of the CPU 14 transmits a signal indicating a request for the verification C, to the DSP 13 (step S1713). The verification processor of the CPU 14 then becomes in a standby state until receiving data for the verification C from the DSP 13 (step S1714). When receiving the data for the verification C, the verification processor of the CPU 14 performs the arithmetic operation C on the basis of the plurality of results of the arithmetic operation B performed by the DSP 13, which are included in the data for the verification C, and generates an arithmetic result (step S1715).

The verification processor of the CPU 14 then transmits the result of the arithmetic operation C in the step S1715, and the result of the arithmetic operation C performed by the DSP 13, which is included in the data for the verification C, to the control apparatus 20 as one data (step S1716), and sets the STEP to "A" (step S1717).

The present invention is not limited to the aforementioned embodiments and examples, but various changes may be made, if desired, without departing from the essence or spirit of the invention which can be read from the claims and the entire specification. An information processing apparatus, an information processing method, a computer program, and a recording medium that involve such changes are also intended to be within the technical scope of the present invention.

DESCRIPTION OF REFERENCE NUMERALS AND LETTERS

10, 10a measuring apparatus
11 sensor
12 A/D unit
13 DSP
14 CPU
20 control apparatus
30 measurement target

The invention claimed is:

1. An information processing apparatus comprising:
a first processor configured to perform a first process on sensor information, which is obtained from a sensor, thereby to generate first information;
a second processor configured to perform a second process, which is different from the first process, on the first information, thereby to generate second information; and
a third processor configured to perform a third process corresponding to at least a part of the second process, on the first information, thereby to generate third information, and configured to obtain the second information and to output the second information and the third information, wherein
said first processor is configured to apply additional information to first information on which the third process is to be performed on the third processor, out of the first information,
said second processor is configured to perform the second process on the first information with the additional information applied, thereby to generate the second information, and is configured to perform a process corresponding to a part of the second process, on the first information with the additional information applied, thereby to generate fourth information, and
said third processor is configured to perform the process corresponding to the part of the second process, as the third process, on the first information with the additional information applied, thereby to generate the third information, and is configured to obtain the fourth information in addition to the second information and to output the second information, the fourth information, and the third information.

2. The information processing apparatus according to claim 1, wherein said third processor is configured to obtain only the first information with the additional information applied, from said first processor.

3. The information processing apparatus according to claim 2, wherein said third processor is configured to request said first processor to apply the additional information, via said second processor, on condition that the third process for the first information with the additional information applied is ended.

4. The information processing apparatus according to claim 1, wherein said third processor is configured to request said first processor to apply the additional information, via said second processor, on condition that the third process for the first information with the additional information applied is ended.

5. The information processing apparatus according to claim 1, wherein said third processor is configured to perform the second process, as the third process, on the first information.

6. The information processing apparatus according to claim 1, wherein
said second processor
is configured to perform a first partial process of the second process on each of a plurality of the first information that are temporally continuous, thereby to generate a plurality of first partial information that are continuous respectively in association with the plurality of first information that are continuous, and
is configured to perform a second partial process of the second process, which is different from the first partial process, on a plurality of first partial information that are continuous and that are a part of the plurality of first partial information that are continuous, thereby to generate second partial information, and
said third processor
is configured to perform the first partial process of the second process, as a part of the third process, on the first information with the additional information applied, thereby to generate third partial information as a part of the third information,
is configured to obtain the plurality of first partial information and to output first partial information corresponding to the first information with the additional information applied, out of the plurality of first partial information, and the third partial information,
is configured to perform the second partial process of the second process, as another part of the third process, on a plurality of first partial information excluding the first partial information corresponding to the first information with the additional information applied, out of the plurality of first partial information that are continuous and that are the part, thereby to generate fourth partial information as another part of the third information, and
is configured to obtain the second partial information and to output the second partial information and the fourth partial information.

7. The information processing apparatus according to claim 1, wherein
said second processor
is configured to perform a first partial process of the second process on each of a plurality of the first information that are temporally continuous, thereby to generate a plurality of first partial information that are continuous respectively in association with the plurality of first information that are continuous, and
is configured to perform a second partial process of the second process, which is different from the first partial process, on a plurality of first partial information that are continuous and that are a part of the plurality of first partial information that are continuous, thereby to generate second partial information, and
said third processor
is configured to obtain the plurality of first partial information that are continuous and that are the part, and to perform the second partial process of the second process as a part of the third process, thereby to generate fifth partial information as a part of the third information, and
is configured to obtain the second partial information and to output the second partial information and the fifth partial information, and
said second processor is configured to output the plurality of first partial information that are continuous and that are the part, to said third processor if it is requested from said third processor.

8. The information processing apparatus according to claim 1, wherein said third processor is configured to obtain the first information via said second processor.

9. The information processing apparatus according to claim 1, wherein said second processor is configured to apply additional information to second information, which is generated by performing the second process on first information on which the third process is to be performed by said third processor, out of the first information.

10. The information processing apparatus according to claim 1, wherein said second processor is configured to divide first information that is to be outputted to said third processor, into a plurality of sixth partial information and to output the plurality of sixth partial information to said third processor.

11. An information processing method in an information processing apparatus including a first processor, a second processor, and a third processor, said information processing method comprising:
a process, by the first processor, of performing a first process on sensor information, which is obtained from a sensor, thereby to generate first information;
a process, by the second processor, of performing a second process, which is different from the first process, on the first information, thereby to generate second information;
a process, by the third processor, of performing a third process corresponding to at least a part of the second process, on the first information, thereby to generate third information; and
a process, by the third processor, of obtaining the second information and of outputting the second information and the third information, wherein
the first processor is configured to apply additional information to first information on which the third process is to be performed on the third processor, out of the first information,
the second processor is configured to perform the second process on the first information with the additional information applied, thereby to generate the second information, and is configured to perform a process corresponding to a part of the second process, on the first information with the additional information applied, thereby to generate fourth information, and
the third processor is configured to perform the process corresponding to the part of the second process, as the third process, on the first information with the additional information applied, thereby to generate the third information, and is configured to obtain the fourth information in addition to the second information and to output the second information, the fourth information, and the third information.

12. An information processing apparatus comprising:
a first processor configured to obtain sensor information from a sensor;
a second processor;
a third processor;
a first signal path for signal transmission via said first processor, said second processor, and said third processor; and a second signal path for signal transmission not via said second processor but via said first processor and said third processor, wherein said third processor (i) is configured to obtain a signal processed by said second processor through said first signal path, and (ii) is configured to obtain a signal processed by said first processor through said second signal path and to simulate at least a part of a process on said second processor.

\* \* \* \* \*